United States Patent
Schillinger et al.

(10) Patent No.: US 10,421,683 B2
(45) Date of Patent: Sep. 24, 2019

(54) METHOD AND DEVICE FOR THE LASER-BASED MACHINING OF SHEET-LIKE SUBSTRATES

(71) Applicant: Corning Laser Technologies GmbH, Krailling (DE)

(72) Inventors: Helmut Schillinger, Krailling (DE); Richard Grundmüller, Krailling (DE)

(73) Assignee: CORNING LASER TECHNOLOGIES GMBH, Corning, NY (US)

( * ) Notice: Subject to any disclaimer, the term of this patent is extended or adjusted under 35 U.S.C. 154(b) by 756 days.

(21) Appl. No.: 14/154,525

(22) Filed: Jan. 14, 2014

(65) Prior Publication Data
US 2014/0199519 A1    Jul. 17, 2014

Related U.S. Application Data

(60) Provisional application No. 61/752,489, filed on Jan. 15, 2013.

(30) Foreign Application Priority Data

Jan. 15, 2013    (EP) .................................... 13151296

(51) Int. Cl.
C03B 33/09    (2006.01)
B23K 26/40    (2014.01)
(Continued)

(52) U.S. Cl.
CPC ........ C03B 33/091 (2013.01); B23K 26/0006 (2013.01); B23K 26/0613 (2013.01);
(Continued)

(58) Field of Classification Search
CPC ............ B23K 26/0006; B23K 26/0057; B23K 26/006; B23K 26/0613; B23K 26/0624;
(Continued)

(56) References Cited

U.S. PATENT DOCUMENTS 1,790,397 A    1/1931    Woods et al.
2,682,134 A    6/1954    Stanley
(Continued)

FOREIGN PATENT DOCUMENTS

CN    2388062 Y    7/2000
CN    1573364 A    2/2005
(Continued)

OTHER PUBLICATIONS

Machine translation of Japan Patent document No. 2006-130,691, May 2017.*
(Continued)

*Primary Examiner* — Geoffrey S Evans
(74) *Attorney, Agent, or Firm* — Smit Kapadia

(57) ABSTRACT

A method for the laser-based machining of a sheet-like substrate, in order to separate the substrate into multiple portions, in which the laser beam of a laser for machining the substrate is directed onto the latter, is characterized in that, with an optical arrangement positioned in the path of rays of the laser, an extended laser beam focal line, seen along the direction of the beam, is formed on the beam output side of the optical arrangement from the laser beam directed onto the latter, the substrate being positioned in relation to the laser beam focal line such that an induced absorption is produced in the material of the substrate in the interior of the substrate along an extended portion, seen in the direction of the beam, of the laser beam focal line, such that a material modification takes place in the material of the substrate along this extended portion.

39 Claims, 11 Drawing Sheets

(51) Int. Cl.
| | |
|---|---|
| *B23K 26/53* | (2014.01) |
| *B23K 26/55* | (2014.01) |
| *B23K 26/06* | (2014.01) |
| *B23K 26/067* | (2006.01) |
| *B23K 26/073* | (2006.01) |
| *C03B 33/02* | (2006.01) |
| *B23K 26/00* | (2014.01) |
| *B23K 26/0622* | (2014.01) |
| *B23K 103/00* | (2006.01) |

(52) U.S. Cl.
CPC ...... *B23K 26/0624* (2015.10); *B23K 26/0648* (2013.01); *B23K 26/0676* (2013.01); *B23K 26/0738* (2013.01); *B23K 26/40* (2013.01); *B23K 26/53* (2015.10); *B23K 26/55* (2015.10); *C03B 33/0222* (2013.01); *B23K 2103/50* (2018.08); *Y02P 40/57* (2015.11); *Y10T 428/24355* (2015.01); *Y10T 428/24471* (2015.01)

(58) Field of Classification Search
CPC ............ B23K 26/0648; B23K 26/0676; B23K 26/0738; B23K 26/402; C03B 33/091
See application file for complete search history.

(56) References Cited

U.S. PATENT DOCUMENTS

| | | | |
|---|---|---|---|
| 2,749,794 A | 6/1956 | O'Leary | |
| 3,647,410 A | 3/1972 | Heaton et al. | |
| 3,695,497 A | 10/1972 | Dear | |
| 3,695,498 A | 10/1972 | Dear | |
| 3,729,302 A | 4/1973 | Heaton | |
| 3,775,084 A | 11/1973 | Heaton | |
| 3,947,093 A * | 3/1976 | Goshima | G02B 5/005 359/716 |
| 4,226,607 A | 10/1980 | Domken | |
| 4,441,008 A | 4/1984 | Chan | |
| 4,546,231 A | 10/1985 | Gresser et al. | |
| 4,646,308 A | 2/1987 | Kafka et al. | |
| 4,764,930 A | 8/1988 | Bille et al. | |
| 4,891,054 A | 1/1990 | Bricker et al. | |
| 4,907,586 A | 3/1990 | Bille et al. | |
| 4,918,751 A | 4/1990 | Pessot et al. | |
| 4,929,065 A | 5/1990 | Hagerty et al. | |
| 5,035,918 A | 7/1991 | Vyas | |
| 5,040,182 A | 8/1991 | Spinelli et al. | |
| 5,104,210 A | 4/1992 | Tokas | |
| 5,108,857 A | 4/1992 | Kitayama et al. | |
| 5,112,722 A | 5/1992 | Tsujino et al. | |
| 5,114,834 A | 5/1992 | Nachshon | |
| 5,265,107 A | 11/1993 | Delfyett, Jr. | |
| 5,326,956 A | 7/1994 | Lunney | |
| 5,400,350 A | 3/1995 | Galvanauskas | |
| 5,434,875 A | 7/1995 | Rieger et al. | |
| 5,436,925 A | 7/1995 | Lin et al. | |
| 5,553,093 A | 9/1996 | Ramaswamy et al. | |
| 5,574,597 A | 11/1996 | Kataoka et al. | |
| 5,586,138 A | 12/1996 | Yokoyama | |
| 5,656,186 A * | 8/1997 | Mourou | A61B 18/20 219/121.69 |
| 5,676,866 A | 10/1997 | In Den Baumen et al. | |
| 5,684,642 A * | 11/1997 | Zumoto | B23K 26/032 359/739 |
| 5,696,782 A | 12/1997 | Harter et al. | |
| 5,736,709 A | 4/1998 | Neiheisel | |
| 5,776,220 A | 7/1998 | Allaire et al. | |
| 6,016,223 A | 1/2000 | Suzuki et al. | |
| 6,016,324 A | 1/2000 | Rieger et al. | |
| 6,033,583 A | 3/2000 | Musket et al. | |
| 6,038,055 A | 3/2000 | Hänsch et al. | |
| 6,055,829 A | 5/2000 | Witzmann et al. | |
| 6,078,599 A | 6/2000 | Everage et al. | |
| 6,156,030 A | 12/2000 | Neev | |
| 6,160,835 A | 12/2000 | Kwon | |
| 6,186,384 B1 | 2/2001 | Sawada | |
| 6,210,401 B1 | 4/2001 | Lai | |
| 6,256,328 B1 | 7/2001 | Delfyett et al. | |
| 6,259,151 B1 | 7/2001 | Morrison | |
| 6,259,512 B1 | 7/2001 | Mizouchi | |
| 6,272,156 B1 | 8/2001 | Reed et al. | |
| 6,301,932 B1 | 10/2001 | Allen et al. | |
| 6,322,958 B1 | 11/2001 | Hayashi | |
| 6,339,208 B1 | 1/2002 | Rockstroh et al. | |
| 6,373,565 B1 | 4/2002 | Kafka et al. | |
| 6,381,391 B1 | 4/2002 | Islam et al. | |
| 6,396,856 B1 | 5/2002 | Sucha et al. | |
| 6,407,360 B1 | 6/2002 | Choo et al. | |
| 6,438,996 B1 | 8/2002 | Cuvelier | |
| 6,445,491 B2 | 9/2002 | Sucha et al. | |
| 6,449,301 B1 | 9/2002 | Wu et al. | |
| 6,484,052 B1 | 11/2002 | Visuri et al. | |
| 6,489,589 B1 | 12/2002 | Alexander | |
| 6,501,578 B1 | 12/2002 | Bernstein et al. | |
| 6,552,301 B2 | 4/2003 | Herman et al. | |
| 6,573,026 B1 | 6/2003 | Aitken et al. | |
| 6,592,703 B1 | 7/2003 | Habeck et al. | |
| 6,635,849 B1 | 10/2003 | Okawa et al. | |
| 6,635,850 B2 | 10/2003 | Amako et al. | |
| 6,720,519 B2 | 4/2004 | Liu et al. | |
| 6,729,161 B1 | 5/2004 | Miura et al. | |
| 6,744,009 B1 | 6/2004 | Xuan et al. | |
| 6,787,732 B1 | 9/2004 | Xuan et al. | |
| 6,800,237 B1 | 10/2004 | Yamamoto et al. | |
| 6,800,831 B1 | 10/2004 | Hoetzel | |
| 6,958,094 B2 | 10/2005 | Ohmi et al. | |
| 6,992,026 B2 | 1/2006 | Fukuyo et al. | |
| 7,009,138 B2 | 3/2006 | Amako et al. | |
| 7,353,829 B1 | 4/2008 | Wachter et al. | |
| 7,402,773 B2 | 7/2008 | Nomaru | |
| 7,511,886 B2 | 3/2009 | Schultz et al. | |
| 7,535,634 B1 | 5/2009 | Savchenkov et al. | |
| 7,633,033 B2 | 12/2009 | Thomas et al. | |
| 7,642,483 B2 | 1/2010 | You et al. | |
| 7,649,153 B2 | 1/2010 | Haight et al. | |
| 7,726,532 B2 | 6/2010 | Gonoe | |
| 7,901,967 B2 | 3/2011 | Komura et al. | |
| 8,104,385 B2 | 1/2012 | Hayashi et al. | |
| 8,118,971 B2 | 2/2012 | Hori et al. | |
| 8,132,427 B2 | 3/2012 | Brown et al. | |
| 8,168,514 B2 | 5/2012 | Garner et al. | |
| 8,245,539 B2 | 8/2012 | Lu et al. | |
| 8,245,540 B2 | 8/2012 | Abramov et al. | |
| 8,269,138 B2 | 9/2012 | Garner et al. | |
| 8,283,595 B2 | 10/2012 | Fukuyo et al. | |
| 8,292,141 B2 | 10/2012 | Cox et al. | |
| 8,296,066 B2 | 10/2012 | Zhao et al. | |
| 8,327,666 B2 | 12/2012 | Harvey et al. | |
| 8,341,976 B2 | 1/2013 | Dejneka et al. | |
| 8,347,651 B2 | 1/2013 | Abramov et al. | |
| 8,358,888 B2 | 1/2013 | Ramachandran | |
| 8,444,906 B2 | 5/2013 | Lee et al. | |
| 8,448,471 B2 | 5/2013 | Kumatani et al. | |
| 8,518,280 B2 | 8/2013 | Hsu et al. | |
| 8,549,881 B2 | 10/2013 | Brown et al. | |
| 8,584,354 B2 | 11/2013 | Cornejo et al. | |
| 8,584,490 B2 | 11/2013 | Garner et al. | |
| 8,592,716 B2 | 11/2013 | Abramov et al. | |
| 8,604,380 B2 | 12/2013 | Howerton et al. | |
| 8,607,590 B2 | 12/2013 | Glaesemann et al. | |
| 8,616,024 B2 | 12/2013 | Cornejo et al. | |
| 8,635,887 B2 | 1/2014 | Black et al. | |
| 8,680,489 B2 | 3/2014 | Martinez et al. | |
| 8,685,838 B2 | 4/2014 | Fukuyo et al. | |
| 8,697,228 B2 | 4/2014 | Carre et al. | |
| 8,720,228 B2 | 5/2014 | Li | |
| 8,826,696 B2 | 9/2014 | Brown et al. | |
| 8,852,698 B2 | 10/2014 | Fukumitsu | |
| 8,887,529 B2 | 11/2014 | Lu et al. | |
| 8,916,798 B2 | 12/2014 | Plüss | |
| 8,943,855 B2 | 2/2015 | Gomez et al. | |
| 8,971,053 B2 | 3/2015 | Kariya et al. | |

(56) References Cited

U.S. PATENT DOCUMENTS

| | | |
|---|---|---|
| 9,138,913 B2 | 9/2015 | Arai et al. |
| 9,227,868 B2 | 1/2016 | Matsumoto et al. |
| 9,290,407 B2 | 3/2016 | Barefoot et al. |
| 9,296,066 B2 | 3/2016 | Hosseini et al. |
| 9,324,791 B2 | 4/2016 | Tamemoto |
| 9,327,381 B2 | 5/2016 | Lee et al. |
| 9,446,590 B2 | 9/2016 | Chen et al. |
| 9,481,598 B2 | 11/2016 | Bergh et al. |
| 2002/0046997 A1 | 4/2002 | Nam et al. |
| 2002/0082466 A1 | 6/2002 | Han |
| 2002/0097486 A1 | 7/2002 | Yamaguchi et al. |
| 2002/0110639 A1 | 8/2002 | Bruns |
| 2003/0006221 A1 | 1/2003 | Hong et al. |
| 2003/0007773 A1 | 1/2003 | Kondo et al. |
| 2004/0221615 A1 | 11/2004 | Postupack et al. |
| 2005/0024743 A1 | 2/2005 | Camy-Peyret |
| 2005/0098548 A1 | 5/2005 | Kobayashi et al. |
| 2005/0115938 A1 | 6/2005 | Sawaki et al. |
| 2005/0274702 A1* | 12/2005 | Deshi ............... B23K 26/40 219/121.72 |
| 2005/0277270 A1* | 12/2005 | Yoshikawa ............ B23K 26/16 438/463 |
| 2006/0011593 A1 | 1/2006 | Fukuyo |
| 2006/0028728 A1 | 2/2006 | Li |
| 2006/0109874 A1 | 5/2006 | Shiozaki et al. |
| 2006/0127679 A1 | 6/2006 | Gulati et al. |
| 2006/0151450 A1 | 7/2006 | You et al. |
| 2006/0227440 A1 | 10/2006 | Gluckstad |
| 2006/0266744 A1* | 11/2006 | Nomaru ............ B23K 26/0057 219/121.75 |
| 2006/0289410 A1 | 12/2006 | Morita et al. |
| 2007/0091977 A1* | 4/2007 | Sohn ................ G02B 6/02147 372/109 |
| 2007/0111390 A1 | 5/2007 | Komura et al. |
| 2007/0111480 A1 | 5/2007 | Maruyama et al. |
| 2007/0119831 A1 | 5/2007 | Kandt |
| 2007/0132977 A1 | 6/2007 | Komatsuda |
| 2007/0138151 A1 | 6/2007 | Tanaka et al. |
| 2007/0177116 A1 | 8/2007 | Amako |
| 2007/0202619 A1 | 8/2007 | Tamura et al. |
| 2007/0298529 A1 | 12/2007 | Maeda et al. |
| 2008/0000884 A1 | 1/2008 | Sugiura et al. |
| 2008/0079940 A1* | 4/2008 | Sezerman ............ C03C 23/0025 356/364 |
| 2008/0099444 A1 | 5/2008 | Misawa et al. |
| 2009/0013724 A1 | 1/2009 | Koyo et al. |
| 2009/0176034 A1 | 7/2009 | Ruuttu et al. |
| 2009/0183764 A1 | 7/2009 | Meyer |
| 2009/0242528 A1 | 10/2009 | Howerton et al. |
| 2009/0250446 A1 | 10/2009 | Sakamoto |
| 2009/0294419 A1 | 12/2009 | Abramov et al. |
| 2009/0294422 A1 | 12/2009 | Lubatschowski et al. |
| 2009/0324899 A1 | 12/2009 | Feinstein et al. |
| 2010/0025387 A1 | 2/2010 | Arai et al. |
| 2010/0029460 A1 | 2/2010 | Shojiya et al. |
| 2010/0032087 A1 | 2/2010 | Takahashi et al. |
| 2010/0086741 A1 | 4/2010 | Bovatsek et al. |
| 2010/0089631 A1 | 4/2010 | Sakaguchi et al. |
| 2010/0089882 A1 | 4/2010 | Tamura |
| 2010/0102042 A1 | 4/2010 | Garner et al. |
| 2010/0129603 A1 | 5/2010 | Blick et al. |
| 2010/0147813 A1 | 6/2010 | Lei et al. |
| 2010/0252540 A1 | 10/2010 | Lei et al. |
| 2010/0252959 A1 | 10/2010 | Lei et al. |
| 2010/0276505 A1 | 11/2010 | Smith |
| 2010/0279067 A1 | 11/2010 | Sabia et al. |
| 2010/0287991 A1 | 11/2010 | Brown et al. |
| 2010/0320179 A1 | 12/2010 | Morita et al. |
| 2010/0326138 A1 | 12/2010 | Kumatani et al. |
| 2011/0037149 A1* | 2/2011 | Fukuyo ............... B23K 26/03 257/620 |
| 2011/0049764 A1 | 3/2011 | Lee et al. |
| 2011/0049765 A1 | 3/2011 | Li et al. |
| 2011/0088324 A1 | 4/2011 | Wessel |
| 2011/0100401 A1 | 5/2011 | Fiorentini |
| 2011/0132881 A1 | 6/2011 | Liu |
| 2011/0139760 A1* | 6/2011 | Shah ................ G01J 11/00 219/121.83 |
| 2011/0183116 A1 | 7/2011 | Hung et al. |
| 2011/0210105 A1 | 9/2011 | Romashko et al. |
| 2011/0240611 A1 | 10/2011 | Sandström et al. |
| 2011/0277507 A1 | 11/2011 | Lu et al. |
| 2011/0300691 A1* | 12/2011 | Sakamoto ............. B23K 26/03 438/462 |
| 2011/0318555 A1 | 12/2011 | Bookbinder et al. |
| 2012/0017642 A1 | 1/2012 | Teranishi et al. |
| 2012/0047951 A1 | 3/2012 | Dannoux et al. |
| 2012/0048604 A1 | 3/2012 | Cornejo et al. |
| 2012/0061440 A1 | 3/2012 | Roell |
| 2012/0064306 A1 | 3/2012 | Kang et al. |
| 2012/0067858 A1* | 3/2012 | Kangastupa ......... B28D 5/0011 219/121.72 |
| 2012/0103018 A1 | 5/2012 | Lu et al. |
| 2012/0131962 A1 | 5/2012 | Mitsugi et al. |
| 2012/0135195 A1 | 5/2012 | Glaesemann et al. |
| 2012/0135607 A1 | 5/2012 | Shimoi et al. |
| 2012/0135608 A1 | 5/2012 | Shimoi et al. |
| 2012/0145331 A1 | 6/2012 | Gomez et al. |
| 2012/0196071 A1 | 8/2012 | Cornejo et al. |
| 2012/0205356 A1 | 8/2012 | Pluess |
| 2012/0234049 A1 | 9/2012 | Bolton |
| 2012/0234807 A1 | 9/2012 | Sercel et al. |
| 2012/0255935 A1* | 10/2012 | Kakui ................ B23K 26/0869 219/121.6 |
| 2012/0299219 A1 | 11/2012 | Shimoi et al. |
| 2012/0302139 A1 | 11/2012 | Darcangelo et al. |
| 2013/0019637 A1 | 1/2013 | Sol et al. |
| 2013/0034688 A1 | 2/2013 | Koike et al. |
| 2013/0044371 A1 | 2/2013 | Rupp et al. |
| 2013/0056450 A1 | 3/2013 | Lissotschenko et al. |
| 2013/0061636 A1 | 3/2013 | Imai et al. |
| 2013/0068736 A1* | 3/2013 | Mielke ................ B23K 26/38 219/121.71 |
| 2013/0075480 A1 | 3/2013 | Yokogi et al. |
| 2013/0091897 A1 | 4/2013 | Fugii et al. |
| 2013/0122264 A1 | 5/2013 | Fujii et al. |
| 2013/0126573 A1* | 5/2013 | Hosseini ............ B23K 26/0057 438/795 |
| 2013/0129947 A1 | 5/2013 | Harvey et al. |
| 2013/0133367 A1 | 5/2013 | Abramov et al. |
| 2013/0143416 A1 | 6/2013 | Norval |
| 2013/0149434 A1 | 6/2013 | Oh et al. |
| 2013/0149494 A1 | 6/2013 | Koike et al. |
| 2013/0167590 A1 | 7/2013 | Teranishi et al. |
| 2013/0174607 A1 | 7/2013 | Wootton et al. |
| 2013/0174610 A1 | 7/2013 | Teranishi et al. |
| 2013/0180285 A1 | 7/2013 | Kariya |
| 2013/0189806 A1 | 7/2013 | Hoshino |
| 2013/0192305 A1 | 8/2013 | Black et al. |
| 2013/0209731 A1 | 8/2013 | Nattermann et al. |
| 2013/0220982 A1 | 8/2013 | Thomas et al. |
| 2013/0221053 A1 | 8/2013 | Zhang |
| 2013/0224439 A1 | 8/2013 | Zhang et al. |
| 2013/0228918 A1 | 9/2013 | Chen et al. |
| 2013/0247615 A1 | 9/2013 | Boek et al. |
| 2013/0266757 A1 | 10/2013 | Giron et al. |
| 2013/0270240 A1 | 10/2013 | Kondo |
| 2013/0280495 A1 | 10/2013 | Matsumoto |
| 2013/0288010 A1 | 10/2013 | Akarapu et al. |
| 2013/0291598 A1 | 11/2013 | Saito et al. |
| 2013/0312460 A1 | 11/2013 | Kunishi et al. |
| 2013/0323469 A1 | 12/2013 | Abramov et al. |
| 2013/0334185 A1 | 12/2013 | Nomaru |
| 2013/0340480 A1 | 12/2013 | Nattermann et al. |
| 2014/0027951 A1 | 1/2014 | Srinivas et al. |
| 2014/0034730 A1 | 2/2014 | Lee |
| 2014/0042202 A1 | 2/2014 | Lee |
| 2014/0047957 A1 | 2/2014 | Wu |
| 2014/0102146 A1 | 4/2014 | Saito et al. |
| 2014/0110040 A1 | 4/2014 | Cok |
| 2014/0113797 A1 | 4/2014 | Yamada et al. |
| 2014/0133119 A1 | 5/2014 | Kariya et al. |
| 2014/0141217 A1 | 5/2014 | Gulati et al. |

(56) References Cited

U.S. PATENT DOCUMENTS

| | | | |
|---|---|---|---|
| 2014/0147623 A1 | 5/2014 | Shorey et al. | |
| 2014/0147624 A1 | 5/2014 | Streltsov et al. | |
| 2014/0165652 A1 | 6/2014 | Saito | |
| 2014/0174131 A1 | 6/2014 | Saito et al. | |
| 2014/0199519 A1 | 7/2014 | Schillinger et al. | |
| 2014/0216108 A1 | 8/2014 | Weigel et al. | |
| 2014/0290310 A1 | 10/2014 | Green | |
| 2014/0320947 A1 | 10/2014 | Egerton et al. | |
| 2014/0333929 A1* | 11/2014 | Sung | G01N 15/1475 356/341 |
| 2014/0361463 A1 | 12/2014 | DeSimone et al. | |
| 2015/0034612 A1 | 2/2015 | Hosseini et al. | |
| 2015/0038313 A1 | 2/2015 | Hosseini | |
| 2015/0075221 A1 | 3/2015 | Kawaguchi et al. | |
| 2015/0075222 A1 | 3/2015 | Mader | |
| 2015/0110442 A1 | 4/2015 | Zimmel et al. | |
| 2015/0118522 A1 | 4/2015 | Hosseini | |
| 2015/0136743 A1 | 5/2015 | Hosseini | |
| 2015/0140241 A1 | 5/2015 | Hosseini | |
| 2015/0140735 A1 | 5/2015 | Hosseini | |
| 2015/0151380 A1 | 6/2015 | Hosseini | |
| 2015/0158120 A1 | 6/2015 | Courvoisier et al. | |
| 2015/0165548 A1 | 6/2015 | Marjanovic et al. | |
| 2015/0165560 A1 | 6/2015 | Hackert et al. | |
| 2015/0165562 A1 | 6/2015 | Marjanovic et al. | |
| 2015/0165563 A1 | 6/2015 | Manley et al. | |
| 2015/0166391 A1 | 6/2015 | Marjanovic et al. | |
| 2015/0166393 A1 | 6/2015 | Marjanovic et al. | |
| 2015/0166394 A1 | 6/2015 | Marjanovic et al. | |
| 2015/0166395 A1 | 6/2015 | Marjanovic et al. | |
| 2015/0166396 A1 | 6/2015 | Marjanovic et al. | |
| 2015/0166397 A1 | 6/2015 | Marjanovic et al. | |
| 2015/0183679 A1 | 7/2015 | Saito | |
| 2015/0232369 A1 | 8/2015 | Marjanovic et al. | |
| 2015/0299018 A1 | 10/2015 | Bhuyan et al. | |
| 2015/0360991 A1 | 12/2015 | Grundmueller et al. | |
| 2015/0367442 A1 | 12/2015 | Bovatsek et al. | |
| 2016/0008927 A1 | 1/2016 | Grundmueller et al. | |
| 2016/0009066 A1 | 1/2016 | Nieber et al. | |
| 2016/0023922 A1 | 1/2016 | Addiego et al. | |
| 2016/0031745 A1 | 2/2016 | Ortner et al. | |
| 2016/0060156 A1 | 3/2016 | Krueger et al. | |
| 2016/0279895 A1 | 9/2016 | Marjanovic et al. | |
| 2016/0280580 A1 | 9/2016 | Bohme | |
| 2016/0290791 A1 | 10/2016 | Buono et al. | |
| 2017/0169847 A1 | 6/2017 | Tamaki | |

FOREIGN PATENT DOCUMENTS

| | | |
|---|---|---|
| CN | 1283409 C | 11/2006 |
| CN | 101386466 A | 3/2009 |
| CN | 101502914 A | 8/2009 |
| CN | 201357287 Y | 12/2009 |
| CN | 101637849 A | 2/2010 |
| CN | 201471092 U | 5/2010 |
| CN | 102060437 A | 5/2011 |
| CN | 102343631 A | 2/2012 |
| CN | 102672355 A | 9/2012 |
| CN | 102898014 A | 1/2013 |
| CN | 102923939 A | 2/2013 |
| CN | 103013374 A | 4/2013 |
| CN | 103143841 A | 6/2013 |
| CN | 203021443 U | 6/2013 |
| CN | 103273195 A | 9/2013 |
| CN | 103316990 A | 9/2013 |
| CN | 103359947 A | 10/2013 |
| CN | 103359948 A | 10/2013 |
| CN | 103531414 A | 1/2014 |
| CN | 103746027 A | 4/2014 |
| CN | 203509350 U | 4/2014 |
| CN | 104344202 A | 2/2015 |
| CN | 102672355 B | 5/2015 |
| DE | 2231330 A1 | 1/1974 |
| DE | 102006035555 A1 | 1/2008 |
| DE | 102011000768 A1 | 8/2012 |
| DE | 102012010635 A1 | 11/2013 |
| DE | 102012110971 A1 | 5/2014 |
| DE | 102013223637 A1 | 5/2015 |
| EP | 270897 A1 | 2/1992 |
| EP | 0609978 A1 | 8/1994 |
| EP | 656241 B1 | 12/1998 |
| EP | 938946 A1 | 9/1999 |
| EP | 949541 A2 | 10/1999 |
| EP | 1159104 B1 | 8/2004 |
| EP | 1609559 A1 | 12/2005 |
| EP | 1043110 B1 | 8/2006 |
| EP | 2133170 A1 | 12/2009 |
| EP | 2202545 A1 | 6/2010 |
| EP | 2574983 A1 | 4/2013 |
| EP | 2754524 B1 | 7/2014 |
| EP | 2781296 A1 | 9/2014 |
| EP | 2783784 A2 | 10/2014 |
| EP | 2859984 A2 | 4/2015 |
| FR | 2989294 A1 | 10/2013 |
| GB | 1242172 A | 8/1971 |
| GB | 2481190 B | 1/2015 |
| JP | 1179770 A | 7/1989 |
| JP | 6318756 A | 11/1994 |
| JP | 9106243 A | 4/1997 |
| JP | 11197498 A | 7/1999 |
| JP | 11269683 A | 10/1999 |
| JP | 11330597 A | 11/1999 |
| JP | 11347758 A | 12/1999 |
| JP | 2001138083 A | 5/2001 |
| JP | 2002210730 A | 7/2002 |
| JP | 2002228818 A | 8/2002 |
| JP | 2003025085 A | 1/2003 |
| JP | 2003062756 A | 3/2003 |
| JP | 2003114400 A | 4/2003 |
| JP | 2003154517 A | 5/2003 |
| JP | 2003181668 A | 7/2003 |
| JP | 2003238178 A | 8/2003 |
| JP | 2004209675 A | 7/2004 |
| JP | 2005104819 A | 4/2005 |
| JP | 2005135964 A | 5/2005 |
| JP | 2005205440 A | 8/2005 |
| JP | 2005288503 A | 10/2005 |
| JP | 2006-130691 A * | 5/2006 |
| JP | 3775250 B2 | 5/2006 |
| JP | 3775410 B2 | 5/2006 |
| JP | 2006130691 A | 5/2006 |
| JP | 2006248885 A | 9/2006 |
| JP | 2007021548 A | 2/2007 |
| JP | 2007196277 A | 8/2007 |
| JP | 2007253203 A | 10/2007 |
| JP | 2009056482 A | 3/2009 |
| JP | 2009-172633 A * | 8/2009 |
| JP | 2010017990 A | 1/2010 |
| JP | 2010046761 A | 3/2010 |
| JP | 4592855 B2 | 12/2010 |
| JP | 2011049398 A | 3/2011 |
| JP | 4672689 B2 | 4/2011 |
| JP | 2011517299 A | 6/2011 |
| JP | 4880820 B2 | 2/2012 |
| JP | 2012024782 A | 2/2012 |
| JP | 2012031018 A | 2/2012 |
| JP | 2012159749 A | 8/2012 |
| JP | 2012187618 A | 10/2012 |
| JP | 2013007842 A | 1/2013 |
| JP | 2013031879 A | 2/2013 |
| JP | 2013043808 A | 3/2013 |
| JP | 2013075802 A | 4/2013 |
| JP | 2013091578 A | 5/2013 |
| JP | 5274085 B2 | 8/2013 |
| JP | 5300544 B2 | 9/2013 |
| JP | 2013187247 A | 9/2013 |
| JP | 2013203630 A | 10/2013 |
| JP | 2013203631 A | 10/2013 |
| JP | 2013223886 A | 10/2013 |
| KR | 2012015366 | 2/2002 |
| KR | 2009057161 | 6/2009 |
| KR | 1020621 | 3/2011 |
| KR | 1120471 B1 | 3/2012 |

(56) References Cited

FOREIGN PATENT DOCUMENTS

| | | |
|---|---|---|
| KR | 2012074508 | 7/2012 |
| KR | 2013031380 | 3/2013 |
| KR | 1269474 | 5/2013 |
| KR | 2013124646 | 11/2013 |
| KR | 1344368 | 12/2013 |
| KR | 2014022980 | 2/2014 |
| KR | 2014022981 | 2/2014 |
| KR | 2014064220 | 5/2014 |
| TW | 201139025 A | 11/2011 |
| TW | 201139025 A | 11/2011 |
| TW | 201226345 | 7/2012 |
| WO | 1999029243 A1 | 7/1999 |
| WO | 1999063900 A1 | 12/1999 |
| WO | 2004110693 A1 | 12/2004 |
| WO | 2006073098 A1 | 7/2006 |
| WO | 2007094160 A1 | 8/2007 |
| WO | WO-2008/049389 A1 * | 5/2008 |
| WO | 2008080182 A1 | 7/2008 |
| WO | 2008128612 A1 | 10/2008 |
| WO | 2009114375 A2 | 9/2009 |
| WO | 2010035736 A1 | 4/2010 |
| WO | 2010111609 A2 | 9/2010 |
| WO | 2010129459 A2 | 11/2010 |
| WO | 2011025908 A1 | 3/2011 |
| WO | 2011056781 A1 | 5/2011 |
| WO | 2012006736 A2 | 1/2012 |
| WO | 2012075072 A2 | 6/2012 |
| WO | 2012108052 A1 | 8/2012 |
| WO | 2012166753 A1 | 12/2012 |
| WO | 2013022148 A1 | 2/2013 |
| WO | 2013043173 A1 | 3/2013 |
| WO | 2013138802 A1 | 9/2013 |
| WO | 2013150990 A1 | 10/2013 |
| WO | 2013153195 A1 | 10/2013 |
| WO | 2014028022 A1 | 2/2014 |
| WO | 2014064492 A1 | 5/2014 |
| WO | 2014079478 A1 | 5/2014 |
| WO | 2014079570 A1 | 5/2014 |
| WO | 2014085663 A1 | 6/2014 |
| WO | 2014111385 A1 | 7/2014 |
| WO | 2014111794 A1 | 7/2014 |
| WO | 2014161534 A2 | 10/2014 |
| WO | 2014161535 A2 | 10/2014 |
| WO | 2015077113 A1 | 5/2015 |
| WO | 2015095088 A1 | 6/2015 |
| WO | 2015095090 A1 | 6/2015 |
| WO | 2015095146 A1 | 6/2015 |
| WO | 2015127583 A1 | 9/2015 |
| WO | 2016005455 A1 | 1/2016 |
| WO | 2016010954 A2 | 1/2016 |
| WO | 20160154284 A1 | 9/2016 |

OTHER PUBLICATIONS

Abakians, H. et al.; Evaporative Cutting of a Semitransparent Body With a Moving CW Laser; Journal of Heat Transfer; Nov. 1988; pp. 924-930; vol. 110; ASME.

Ahmed, F. et al.; Display glass cutting by femtosecond laser induced single shot periodic void array; Applied Physics A Material Science & Processing; Jun. 3, 2008; pp. 189-192; vol. 93; Springer-Verlag.

Bagchi, S. et al.; Fast ion beams from intense, femtosecond laser irradiated nanostructured surfaces; Applied Physics B Lasers and Optics; Jun. 27, 2007; pp. 167-173; vol. 88; Springer-Verlag.

Bhuyan, M.K. et al.; Femtosecond non-diffracting Bessel beams and controlled nanoscale ablation; ResearchGate Conference Paper; Sep. 2011; pp. 1-4.

Bhuyan, M.K. et al.; Laser micro- and nanostructuring using femtosecond Bessel beams; The European Physical Journal Special Topics; Dec. 7, 2011; pp. 101-110; vol. 1999; EDP Sciences, Springer-Verlag.

Bhuyan, M.K. et al.; Single-shot high aspect ratio bulk nanostructuring of fused silica using chirp-controlled ultrafast laser Bessel beams; Applied Physics Letters; Jan. 14, 2014; pp. 021107-1-021107-4; vol. 104; AIP Publishing LLC.

Case Design Guidelines for Apple Devices; Sep. 13, 2013; pp. 1-58; Apple Inc.

Chiao, R. Y. et al.; Self-Trapping of Optical Beams; Physical Review Letters; Oct. 12, 1964; pp. 479-482; vol. 13, No. 15.

Corning EAGLE AMLCD Glass Substrates Material Information; Apr. 2005; pp. MIE 201-1-MIE 201-3; Corning Incorporated.

Corning 1737 AMLCD Glass Substrates Material Information; Aug. 2002; pp. MIE 101-1-MIE 101-3; Corning Incorporated.

Couairon, A. et al.; Femtosecond filamentation in transparent media; ScienceDirect Physical Reports; Feb. 6, 2007; pp. 47-189; vol. 441; Elsevier B.V.

Courvoisier, F. et al.; Applications of femtosecond Bessel beams to laser ablation; Applied Physics A Materials Science & Processing; Sep. 6, 2012; pp. 29-34; vol. 112; Springer-Verlag.

Courvoisier, F. et al.; Surface nanoprocessing with nondiffracting femtosecond Bessel beams; Optics Letters; Oct. 15, 2009; pp. 3163-3165; vol. 34, No. 20; Optical Society of America.

Dong, M. et al.; On-axis irradiance distribution of axicons illuminated by spherical wave; ScienceDirect Optics & Laser Technology; Sep. 2007; pp. 1258-1261; vol. 39; Elsevier Ltd.

Durnin, J.; Exact solutions for nondiffracting beams. I. The scalar theory; J. Opt. Soc. Am. A; Apr. 1987; pp. 551-654; vol. 4, No. 4; Optical Society of America.

Eaton, S. et al.; Heat accumulation effects in femtosecond laser-written waveguides with variable repetition rate; Optics Express; Jun. 13, 2005; pp. 4708-4716; vol. 13, No. 12; Optical Society of America.

Gattass, R. et al.; Micromachining of bulk glass with bursts of femtosecond laser pulses at variable repetition rates; Optics Express; Jun. 12, 2006; pp. 5279-5284; vol. 14, No. 12; Optical Society of America.

Gori, F. et al.; Analytical derivation of the optimum triplicator; Optics Communications; Dec. 1, 1998; pp. 13-16; vol. 157; Elsevier B.V.

Hu, Z. et al.; 5-Axis Laser Cutting Interference Detection and Correction Based on STL Model; Chinese Journal of Lasers; Dec. 2009; pp. 3313-3317; vol. 36, No. 12.

Huang, Z. et al.; Laser etching of glass substrates by 1064 nm laser irradiation; Applied Physics A Materials Science & Processing; Jun. 6, 2008; pp. 159-163; vol. 93; Springer-Verlag.

Juodkazis, S. et al.; Laser-Induced Microexplosion Confined in the Bulk of a Sapphire Crystal: Evidence of Multimegabar Pressures; Physical Review Letters; Apr. 28, 2006; pp. 166101-1-166101-4; vol. 96; The American Physical Society.

Karlsson, S. et al.; The Technology of Chemical Glass Strengthening—A Review; Glass Technology—European Journal of Glass Science and Technology Part A; Apr. 2010; pp. 41-54; vol. 51, No. 2.

Levy et al.; Design, fabrication, and characterization of circular Dammann gratings based on grayscale lithography; Optics Letters; Mar. 15, 2010; pp. 880-882; vol. 35, No. 6; Optical Society of America.

Liu, X. et al.; Laser Ablation and Micromachining with Ultrashort Laser Pulses; IEEE Journal of Quantum Electronics; Oct. 1997; p. 1706-1716; vol. 33, No. 10; IEEE.

McGloin, D. et al.; Bessel beams: diffraction in a new light; Contemporary Physics; Jan.-Feb. 2005; pp. 15-28; vol. 46; Taylor & Francis Ltd.

Merola, F. et al.; Characterization of Bessel beams generated by polymeric microaxicons; Measurement Science and Technology; May 15, 2012; pp. 1-10; vol. 23; IOP Publishing Ltd.

Mirkhalaf, M. et al.; Overcoming the brittleness of glass through bio-inspiration and micro-architecture; Nature communications; Jan. 28, 2014; pp. 1-9; Macmillan Publishers Limited.

Romero, L. et al.; Theory of optimal beam splitting by phase gratings. II. Square and hexagonal gratings; J. Opt. Soc. Am. A; Aug. 2007; pp. 2296-2312; vol. 24, No. 8; Optical Society of America.

Salleo, A. et al.; Machining of transparent materials using an IR and UV nanosecond pulsed laser; Applied Physics a Materials Science & Processing; Sep. 20, 2000; pp. 601-608; vol. 71; Springer-Verlag.

(56) References Cited

OTHER PUBLICATIONS

Shah, L. et al.; Micromachining with a High Repetition Rate Femtosecond Fiber Laser; JLMN—Journal of Laser Micro/Nanoengineering; Nov. 2008; pp. 157-162; vol. 3, No. 3.
Shealy, D. et al.; Geometric optics-based design of laser beam shapers; Opt. Eng.; Nov. 2003; pp. 3123-3138; vol. 42, No. 11; Society of Photo-Optical Instrumentation Engineers.
Stoian, R. et al.; Spatial and temporal laser pulse design for material processing on ultrafast scales; Applied Physics A Materials Science & Processing; Jan. 1, 2014; pp. 119-127; vol. 114; Springer-Verlag Berlin Heidelberg.
Thiele, E.; Relation between Catalytic Activity and Size of Particle; Industrial and Engineering Chemistry; Jul. 1939; pp. 916-920; vol. 31, No. 7.
Toytman, I. et al.; Optical breakdown in transparent media with adjustable axial length and location; Optic Express; Nov. 22, 2010; pp. 24688-24698; vol. 18, No. 24; Optical Society of America.
Wang, Z. et al.; Investigation on CO2 laser irradiation inducing glass strip peeling for microchannel formation; Biomicrofluidics; Mar. 12, 2012; pp. 012820-1-012820-12; vol. 6; American Institute of Physics.
Wu, W. et al.; Optimal Orientation of the Cutting Head for Enhancing Smoothness Movement in Three-Dimensional Laser Cutting; Chinese Journal of Lasers; Jan. 2013; pp. 0103005-1-0103005-7, vol. 10, No. 1.
Xu, H. et al.; Optimization of 3D laser cutting head orientation based on minimum energy consumption; Int J Adv Manuf Technol; Jun. 28, 2014; pp. 1283-1291; vol. 74; Springer-Verlag London.
Yan, Y. et al.; Fiber structure to convert a Gaussian beam to higher-order optical orbital angular momentum modes; Optics Letters; Aug. 15, 2012; pp. 3294-3296; vol. 37, No. 16; Optical Society of America.
Arimoto et al., "Imaging properties of axicon in a scanning optical system"; Applied Optics, Nov. 1, 1992, vol. 31, No. 31, pp. 6653-6657.
"TruMicro 5000" Product Manual, Trumpf Laser GmbH + Co. KG, pp. 1-4, Aug. 2011.
Cubeddu et al., "A compact time-resolved reflectance system for dual-wavelength multichannel assessment of tissue absorption and scattering"; Part of the SPIE Conference on Optical Tomography and Spectroscopy of Tissue III, San Jose, CA (Jan. 1999), SPIE vol. 3597, 0277-786X/99, pp. 450-455.
Cubeddu et al., "Compact tissue oximeter based on dual-wavelength multichannel time-resolved reflectance"; Applied Optics, vol. 38, No. 16, Jun. 1, 1999, pp. 3670-3680.
Ding et al., "High-resolution optical coherence tomography over a large depth range with an axicon lens"; Optic Letters, vol. 27, No. 4, pp. 243-245, Feb. 15, 2002, Optical Society of America.

"EagleEtch" Product Brochure, EuropeTec USA Inc., pp. 1-8, Aug. 1, 2014.
Girkin et al., "Macroscopic multiphoton biomedical imaging using semiconductor saturable Bragg reflector modelocked Lasers"; Part of the SPIE Conference on Commercial and Biomedical Applications of Ultrafast Lasers, San Jose, CA (Jan. 1999), SPIE vol. 3616, 0277-786X/99, pp. 92-98.
Golub, I., "Fresnel axicon"; Optic Letters, vol. 31, No. 12, Jun. 15, 2006, Optical Society of America, pp. 1890-1892.
Herman et al., "Laser micromachining of 'transparent' fused silica with 1-ps pulses and pulse trains"; Part of the SPIE Conference on Commercial and Biomedical Applications of Ultrafast Lasers, San Jose, CA (Jan. 1999), SPIE vol. 3616, 0277-786X/99, pp. 148-155.
Perry et al., "Ultrashort-pulse laser machining"; UCRL-JC-132159 Rev 1., Jan. 22, 1999, pp. 1-24.
Perry et al., "Ultrashort-pulse laser machining"; UCRL-ID-132159, Sep. 1998, pp. 1-38.
Perry et al., "Ultrashort-pulse laser machining of dielectric materials"; Journal of Applied Physics, vol. 85, No. 9, May 1, 1999, American Institute of Physics, pp. 6803-6810.
"Pharos High-power femtosecond laser system" product brochure; Light Conversion, Vilnius, LT; Apr. 18, 2011, pp. 1-2.
Polynkin et al., "Extended filamentation with temporally chirped femtosecond Bessel-Gauss beams in air"; Optics Express, vol. 17, No. 2, Jan. 19, 2009, OSA, pp. 575-584.
Sundaram et al., "Inducing and probing non-thermal transitions in semiconductors using femtosecond laser pulses"; Nature Miracles, vol. 1, Dec. 2002, Nature Publishing Group (2002), pp. 217-224.
Vanagas et al., "Glass cutting by femtosecond pulsed irradiation"; J. Micro/Nanolith. MEMS MOEMS. 3(2), 358-363 (Apr. 1, 2004); doi: 10.1117/1.1668274.
Zeng et al. "Characteristic analysis of a refractive axicon system for optical trepanning"; Optical Engineering 45(9), 094302 (Sep. 2006), pp. 094302-1-094302-10.
Zhang et al., "Design of diffractive-phase axicon illuminated by a Gaussian-profile beam"; Acta Physica Sinica (overseas edition), vol. 5, No. 5 (May 1996) Chin. Phys. Soc., 1004-423X/96/05050354-11, pp. 354-364.
Kerr. "Filamentary tracks formed in transparent optical glass by laser beam self-focusing. II. Theoretical Analysis" Physical Review A. 4(3) 1971, pp. 1196-1218.
"Taiwanese Application Serial No. 103101310, Office Action dated Jul. 26, 2017", w/English Claims, 15 pgs.
"Taiwanese Application Serial No. 103101310, Office Action dated Dec. 29, 2017", Summarized English translation, 6 pgs.
"Taiwanese Application Serial No. 103101310, Response filed Apr. 16, 2018 to Office Action dated Dec. 29, 2017", Summarized English translation, 110 pgs.
"Taiwanese Application Serial No. 103101310, Response filed Oct. 26, 2017 to Office Action dated Jul. 26, 2017", 123 pgs.

* cited by examiner

METHOD AND DEVICE FOR THE LASER-BASED MACHINING OF SHEET-LIKE SUBSTRATES

CROSS-REFERENCE TO RELATED APPLICATIONS

This application claims the benefit of priority under 35 U.S.C. § 119 of U.S. Provisional Application Ser. No. 61/752,489 filed on Jan. 15, 2013, and claims priority under 35 U.S.C. § 119 or 365 to European Application No. EP 13 151 296, filed Jan. 15, 2013, the content of which is relied upon and incorporated herein by reference in its entirety.

BACKGROUND

The disclosure relates generally to a method for the laser-based machining of preferably sheet-like substrates and to a corresponding device and to the use of methods and devices for separating sheet-like substrates, such as for example semiconductor wafers, glass elements, . . . (in particular of brittle materials) into multiple parts (individually separating the wafers or glass elements). As further described in detail below, work is in this case performed using lasers, generally pulsed lasers, with a wavelength to which the materials are substantially transparent.

Devices and methods for severing such materials by means of a laser are already known from the prior art. On the one hand (for example DE 10 2011 000 768 A1), it is possible to use lasers which, by virtue of their wavelength or their power, are strongly absorbed by the material, or after the first interaction make the material strongly absorbent (heating with for example the generation of charge carriers; induced absorption), and can then ablate the material. This method has disadvantages in the case of many materials: for example impurities due to particle formation in the ablation; cut edges may have microcracks on account of the heat input; cut edges may have melt edges; the cutting gap is not uniform over the thickness of the material (has a different width at different depths; for example a wedge-shaped cutting notch). Since material has to be vaporized or liquefied, a high average laser power has to be provided.

On the other hand, there are known laser methods for severing brittle materials that function on the basis of a specifically directed, laser-induced crack formation. For example, there is a method from Jenoptik in which a trace on the surface is first strongly heated by the laser, and immediately thereafter this trace is cooled so quickly (for example by means of a water jet) that the thermal stresses thereby achieved lead to crack formation, which may be propagated through the thickness of the material (mechanical stress) in order to sever the material.

There are also methods in which a laser at the wavelength of which the material is largely transparent is used, so that a focal point can be produced in the interior of the material. The intensity of the laser must be so high that internal damage takes place at this internal focal point in the material of the irradiated substrate.

The last-mentioned methods have the disadvantage that the induced crack formation takes place in the form of a point at a specific depth, or on the surface, and so the full thickness of the material is only severed by way of an additional, mechanically and/or thermally induced crack propagation. Since cracks tend to spread unevenly, the separating surface is usually very rough and must often be re-worked. Moreover, the same process has to be applied a number of times at different depths. This in turn slows down the speed of the process by the corresponding multiple.

No admission is made that any reference cited herein constitutes prior art. Applicant expressly reserves the right to challenge the accuracy and pertinency of any cited documents.

SUMMARY

An object of the present invention is therefore to provide a method (and a corresponding device) with which sheet-like substrates, in particular of brittle materials, can be machined, in particular completely severed, without significant particle formation, without significant melt edges, with minimal crack formation at the edge, without significant cutting gaps (that is to say material losses), with straightest-possible cut edges and with a high speed of the process.

One embodiment of the disclosure relates to a method that includes focusing a pulsed laser beam into a laser beam focal line, viewed along the beam propagation direction, the laser beam focal line having a length in a range of between 0.1 mm and 100 mm, and directing the laser beam focal line into a material at an angle of incidence to a surface of the material, the laser beam focal line generating an induced absorption within the material, the induced absorption producing a material modification along the laser beam focal line within the material.

An additional embodiment of the disclosure relates to a system that includes a pulsed laser and an optical assembly positioned in the beam path of the laser, configured to transform the laser beam into an laser beam focal line, viewed along the beam propagation direction, on the beam emergence side of the optical assembly, the laser beam focal line having a length in a range of between 0.1 mm and 100 mm, the optical assembly including a focusing optical element with spherical aberration configured to generate the laser beam focal line, said laser beam focal line adapted to generate an induced absorption within a material, the induced absorption producing a material modification along the laser beam focal line within the material.

Another embodiment of the disclosure relates to a glass article that includes at least one surface having a plurality of material modifications along the surface, each material modification having a length in a range of between 0.1 mm and 100 mm, and an average diameter in a range of between 0.5 μm and 5 μm. Yet another embodiment of the disclosure relates to a glass article comprising at least one surface having a plurality of material modifications along the surface, each material modification having a ratio V3=a/δ of the average distance a of the directly neighboring material modifications and the average diameter δ of a laser beam focal line that created the material modifications equal to approximately 2.0.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or

DETAILED DESCRIPTION

Figure 1:
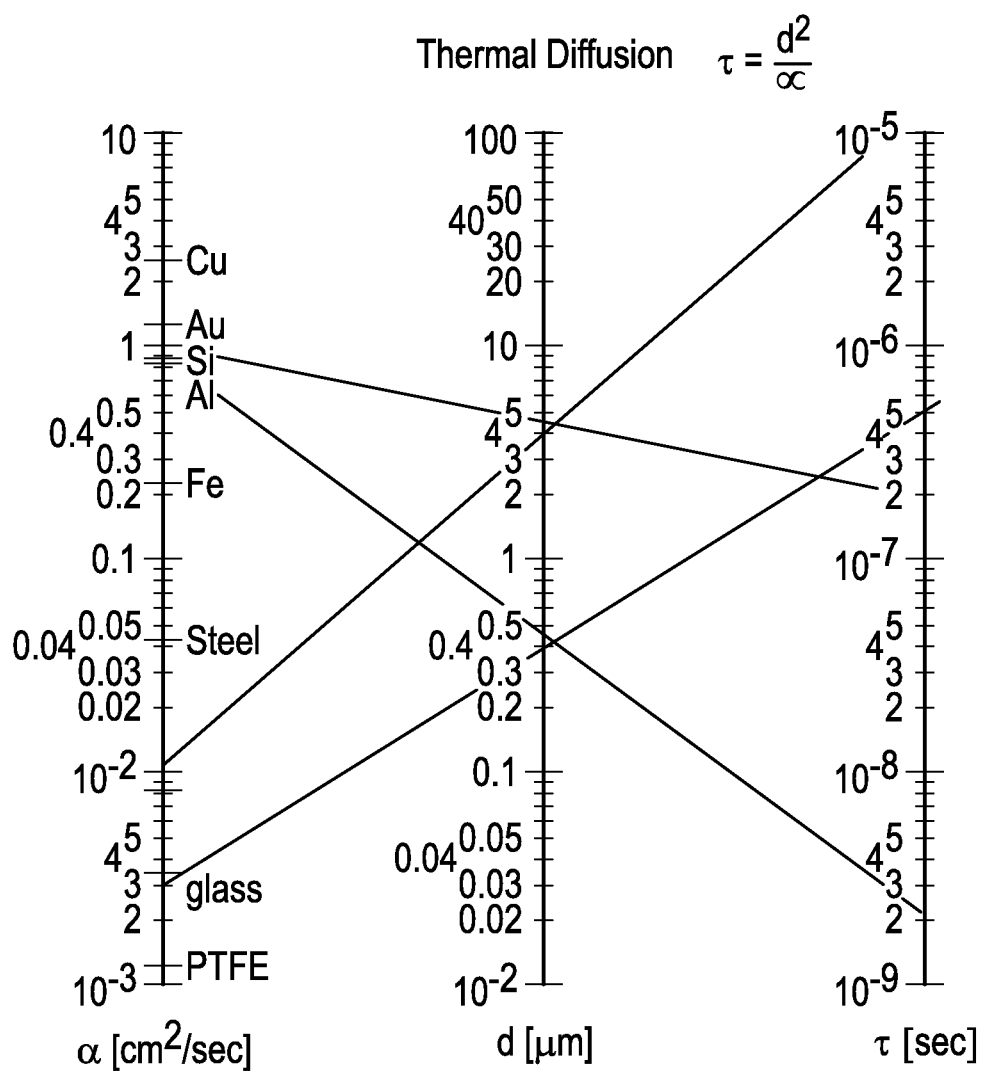
FIG. 1 shows the relationship between the heat diffusion constant α, the linear extent in the material (scale length, denoted here by d) and a time duration τ, such as for example the laser pulse duration for various materials.

Various embodiments will be further clarified by the following examples.

One embodiment of the disclosure relates to a method that includes focusing a pulsed laser beam into a laser beam focal line, viewed along the beam propagation direction, the laser beam focal line having a length in a range of between 0.1 mm and 100 mm, and directing the laser beam focal line into a material at an angle of incidence to a surface of the material, the laser beam focal line generating an induced absorption within the material, the induced absorption producing a material modification along the laser beam focal line within the material. The method can further include translating the material and the laser beam relative to each other, thereby producing a plurality of material modifications within the material, the material modifications spaced apart so as to separate the material into at least two pieces. The laser beam can have an average laser energy measured at the material less than about 400 µJ, such as less than about 250 µJ. The pulse duration can be in a range of between greater than about 10 picoseconds and less than about 100 picoseconds, or less than 10 picoseconds. The pulse repetition frequency can be in a range of between 10 kHz and 1000 kHz, such as in a range of between 10 kHz and 100 kHz, or less than 10 kHz. The material can be glass, sapphire, a semiconductor wafer, or the like. Material modification can be crack formation. The angle of incidence of the laser beam focal line can be less than or equal to about 45 degrees to the surface of the material, such as perpendicular to the surface of the material. The laser beam focal line can be contained entirely within the material, with the laser beam focal line not extending to either surface of the material. The material modification can extend within the material to at least one of two opposing surfaces of the material, such as extending within the material from one of two opposing surfaces of the material to the other one of the two opposing surfaces, over the entire thickness of the material. In particular, for each laser pulse, the material modification can extend within the material from one of two opposing surfaces of the material to the other one of the two opposing surfaces, over the entire thickness of the material. The pulsed laser beam can have a wavelength selected such that the material is substantially transparent at this wavelength. The wavelength can be less than about 1.8 µm. The laser beam focal line can have an average spot diameter in a range of between 0.5 µm and 5 µm.

An additional embodiment of the disclosure relates to a system that includes a pulsed laser and an optical assembly positioned in the beam path of the laser, configured to transform the laser beam into an laser beam focal line, viewed along the beam propagation direction, on the beam emergence side of the optical assembly, the laser beam focal line having a length in a range of between 0.1 mm and 100 mm, the optical assembly including a focusing optical element with spherical aberration configured to generate the laser beam focal line, said laser beam focal line adapted to generate an induced absorption within a material, the induced absorption producing a material modification along the laser beam focal line within the material. The laser energy, pulse duration, pulse repetition frequency, wavelength, focal line diameter, material, and material modification for the system can be as described above for the method. The optical assembly can include an annular aperture positioned in the beam path of the laser before the focusing optical element, the annular aperture configured to block out one or more rays in the center of the laser beam so that only marginal rays outside the center incide on the focusing optical element, and thereby only a single laser beam focal line, viewed along the beam direction, is produced for each pulse of the pulsed laser beam. The focusing optical element can be a spherically cut convex lens, such as a conical prism having a non-spherical free surface, such as an axicon. The optical assembly can further include a second optical element, the two optical elements positioned and aligned such that the laser beam focal line is generated on the beam emergence side of the second optical element at a distance from the second optical element.

Another embodiment of the disclosure relates to a glass article that includes at least one surface having a plurality of material modifications along the surface, each material modification having a length in a range of between 0.1 mm and 100 mm, and an average diameter in a range of between 0.5 µm and 5 µm. Yet another embodiment of the disclosure relates to a glass article comprising at least one surface having a plurality of material modifications along the surface, each material modification having a ratio V3=a/δ of the average distance a of the directly neighboring material modifications and the average diameter δ of a laser beam focal line that created the material modifications equal to approximately 2.0.

The present disclosure is described below, at first generally, then in detail on the basis of several exemplary embodiments. The features shown in combination with one another in the individual exemplary embodiments do not all have to be realized. In particular, individual features may also be omitted or combined in some other way with other features shown of the same exemplary embodiment or else of other exemplary embodiments. It is also possible that individual features of one exemplary embodiment already in themselves display advantageous developments of the prior art.

The mechanism of separating the substrate into individual parts is first described below.

The separating method produces for each laser pulse a laser focal line (as distinct from a focal point) by means of laser optics suitable therefor (hereinafter also referred to as an optical arrangement). The focal line determines the zone of the interaction between the laser and the material of the substrate. If the focal line falls in the material to be separated, the laser parameters can be chosen such that an interaction with the material which produces a crack zone along the focal line takes place. Important laser parameters here are the wavelength of the laser, the pulse duration of the laser, the pulse energy of the laser and possibly also the polarization of the laser.

The following should preferably be provided for the interaction of the laser light with the material:

1) The wavelength l of the laser is preferably chosen such that the material is substantially transparent at this wavelength (specifically for example: absorption <<10% per mm of material depth=>γ<<1/cm; γ: Lambert-Beer absorption coefficient).

2) The pulse duration of the laser is preferably chosen such that no significant heat transport (heat diffusion) out of the zone of interaction can take place within the time of interaction (specifically for example: $\tau<<d^2/\alpha$, d: focus diameter, $\tau$: laser pulse duration, $\alpha$: heat diffusion constant of the material).

3) The pulse energy of the laser is preferably chosen such that the intensity in the zone of interaction, that is to say in the focal line, produces an induced absorption, which leads to local heating of the material along the focal line, which in turn leads to crack formation along the focal line as a result of the thermal stress introduced into the material.

4) The polarization of the laser influences both the interaction at the surface (reflectivity) and the type of interaction within the material in the induced absorption. The induced absorption may take place by way of induced, free charge carriers (typically electrons), either after thermal excitation, or by way of multiphoton absorption and internal photoionization, or by way of direct field ionization (field strength of the light breaks electron bonding directly). The type of generation of the charge carriers can be assessed for example by way of the so-called Keldysh parameter, which however does not play any role for the application of the method. In the case of certain materials (for example birefringent materials) it may just be important that the further absorption/transmission of the laser light depends on the polarization, and consequently the polarization by way of suitable optics (phase plates) should be chosen by the user to be conducive for separating the respective material, for example simply in a heuristic way. Therefore, if the material is not optically isotropic, but for example birefringent, the propagation of the laser light in the material is also influenced by the polarization. Thus, the polarization and the orientation of the polarization vector may be chosen such that, as desired, there only forms one focal line and not two (ordinary and extraordinary rays). In the case of optically isotropic materials, this does not play any role.

5) Furthermore, the intensity should be chosen on the basis of the pulse duration, the pulse energy and the focal line diameter such that there is preferably no significant ablation or significant melting, but preferably only crack formation in the microstructure of the solid body. For typical materials such as glass or transparent crystals, this requirement can be satisfied most easily with pulsed lasers in the sub-nanosecond range, that is to say in particular with pulse durations of for example between 10 and 100 ps. In this respect, also see FIG. 1: over scale lengths of approximately one micrometer (0.5 to 5.0 micrometers, cf. center of image), for poor heat conductors, such as glasses for example, the heat conduction acts into the sub-microsecond range (see the range between the two lines), while for good heat conductors, such as crystals and semiconductors, the heat conduction is already effective within nanoseconds.

The essential process for the crack formation in the material occurring, and made to extend vertically to the plane of the substrate, is mechanical stress that exceeds the structural strength of the material (compressive strength in MPa). The mechanical stress is achieved here by way of rapid, inhomogeneous heating (thermally induced stress) by the laser energy. Presupposing appropriate positioning of the substrate in relation to the focal line (see below), the crack formation starts of course at the surface of the substrate, since that is where the deformation is greatest. The reason for this is that in the half-space above the surface there is no material that can absorb forces. This argument also applies to materials with hardened or toughened surfaces, as long as the thickness of the hardened or toughened layer is great in comparison with the diameter of the abruptly heated material along the focal line. In this respect also see FIG. 2, further described below.

The type of interaction can be set by way of the fluence (energy density in Joules per $cm^2$) and the laser pulse duration with a selected focal line diameter such that preferably 1.) no significant melting takes place at the surface or in the volume and 2.) no significant ablation with particle formation takes place at the surface. In the substantially transparent materials, several types of induced absorption are known:

a) In semiconductors and isolators with a low band gap, on the basis for example of a low residual absorption (due to traces of impurities in the material or due to charge carriers already thermally excited at the temperature before the laser machining), rapid heating up within a first fraction of the laser pulse duration will lead to thermal excitation of further charge carriers, which in turn leads to increased absorption and consequently to a cumulative increase in the laser absorption in the focal line.

b) In isolators, if there is sufficiently high light intensity, a photo absorption leads to an ionization on the basis of a nonlinear-optical interaction with the atoms of the material, and consequently in turn to the generation of free charge carriers, and consequently to increased linear absorption of the laser light.

The production of the geometry of a desired separating surface (relative movement between the laser beam and the substrate along a line on the substrate surface) is described below.

The interaction with the material produces for each laser pulse an individual, continuous (seen in the direction perpendicular to the substrate surface) crack zone in the material along a focal line. For the complete severing of the material, a series of these crack zones for each laser pulse is set so close together along the desired separating line that a lateral connection of the cracks produces a desired crack surface/contour in the material. For this, the laser is pulsed at a specific repetition rate. The spot size and spacing are chosen such that a desired, directed crack formation occurs at the surface, along the line of the laser spots. The spacing of the individual crack zones along the desired separating surface is obtained from the movement of the focal line in relation to the material within the time period from laser pulse to laser pulse. In this respect, also see FIG. 9, further described below.

To produce the desired separating surface in the material, either the pulsed laser light may be moved over the stationary material by an optical arrangement that is movable parallel to the plane of the substrate (and possibly also perpendicularly thereto), or the material itself is moved with a movable holder past the stationary optical arrangement such that the desired separating line is formed. The orientation of the focal line in relation to the surface of the material, whether perpendicular or at an angle of 90°-β to the surface, may either be chosen as a fixed value or be changed by way of a pivotable optical arrangement (hereinafter also referred to for simplicity as optics) and/or a pivotable beam path of the laser along the desired separating line.

Altogether, for forming the desired separating line, the focal line may be passed through the material in up to five separately movable axes: two spatial axes (x, y), which fix the point of penetration of the focal line into the material, two angular axes (theta, phi), which fix the orientation of the focal line from the point of penetration into the material, and a further spatial axis (z', not necessarily orthogonal to x, y), which fixes how deep the focal line reaches into the material from the point of penetration at the surface. For the geometry in the Cartesian system of coordinates (x, y, z), also see for example FIGS. 5a and 6, described below. In the case of perpendicular incidence of the laser beam on the substrate surface (β=0°), then z=z'.

There are generally restrictions here, dictated by the optics and the laser parameters: the orientation of the angles in theta and phi can only take place to the extent that the refraction of the laser light in the material allows (less than the angle of total reflection in the material), and the depth of penetration of the laser focal line is restricted by the available laser pulse energy and the accordingly chosen laser optics, which only forms a length of the focal line that can produce the crack zone with the laser pulse energy available.

One possible configuration for moving the focal lines in all five axes may for example comprise moving the material on a driven axial table in the coordinates x, y, while by way of a galvoscanner and a non-telecentric F-theta lens the focal line is moved in the field of the lens in relation to the center of the lens in the coordinates x', y' and is tilted by the angles theta, phi. The coordinates x and x' and y and y' may be calculated such that the focal line is directed at the desired point of impingement of the surface of the material. The galvoscanner and F-theta lens are also fastened on a z axis, which is orthogonal to the x,y plane of the axial table and determines the position of the focal line perpendicularly to the material (depth of the focal line in the material).

The last step of separating the substrate into the multiple parts is described below (separation or individual separation).

The separation of the material along the crack surface/contour produced takes place either by internal stress of the material or by forces introduced, for example mechanically (tension) or thermally (uneven heating/cooling). Since, preferably, no significant amount of material is ablated, there is generally initially no continuous gap in the material, but only a highly disturbed fracture surface area (microcracks), which is meshed within itself and under some circumstances still connected by bridges. The forces subsequently introduced have the effect of separating the remaining bridges and overcoming the meshing by way of lateral crack growth (taking place parallel to the plane of the substrate), so that the material can be separated along the separating surface.

Additional embodiments of a method and of a device are described below.

In one embodiment, a method for the laser-based machining of a preferably sheet-like substrate (1), in particular a wafer or glass element, in order to separate the substrate into multiple parts, in which the laser beam (2a, 2b) of a laser (3) for machining the substrate (1) is directed onto the latter, is characterized in that with an optical arrangement (6) positioned in the path of rays of the laser (3), an extended laser beam focal line (2b), seen along the direction of the beam, is formed on the beam output side of the optical arrangement (6) from the laser beam (2a) directed onto the latter, the substrate (1) being positioned in relation to the laser beam focal line (2b) such that an induced absorption is produced in the material of the substrate (1) along an extended portion (2c), seen in the direction of the beam, of the laser beam focal line (2b), with the effect that an induced crack formation takes place in the material of the substrate along this extended portion (2c).

In some embodiments, the substrate (1) is positioned in relation to the laser beam focal line (2b) such that the extended portion (2c) of the induced absorption in the material, that is to say in the interior of the substrate (1), extends up to at least one of the two opposite substrate surfaces (1a, 1b).

In certain embodiments, the substrate (1) is positioned in relation to the laser beam focal line (2b) such that the extended portion (2c) of the induced absorption in the material, that is to say in the interior of the substrate (1), extends from one (1a) of the two opposite substrate surfaces up to the other (1b) of the two opposite substrate surfaces, that is to say over the entire layer thickness d of the substrate (1) or in that the substrate (1) is positioned in relation to the laser beam focal line (2b) such that the extended portion (2c) of the induced absorption in the material, that is to say in the interior of the substrate (1), extends from one (1a) of the two opposite substrate surfaces into the substrate (1), but not up to the other (1b) of the two opposite substrate surfaces, that is to say not over the entire layer thickness d of the substrate (1), preferably extends over 80% to 98%, preferably over 85 to 95%, particularly preferably over 90%, of this layer thickness.

In some embodiments, the induced absorption is produced such that the crack formation takes place in the microstructure of the substrate (1) without ablation and without melting of material of the substrate (1).

In certain embodiments, the extent l of the laser beam focal line (2b) and/or the extent of the portion (2c) of the induced absorption in the material, that is to say in the interior of the substrate (1), seen in each case in the longitudinal direction of the beam, is between 0.1 mm and 100 mm, preferably between 0.3 mm and 10 mm, and/or in that the layer thickness d of the substrate (1), measured perpendicularly to the two opposite substrate surfaces (1a, 1b), is between 30 μm and 3000 μm, preferably between 100 μm and 1000 μm, and/or in that the ratio V1=l/d of this extent l of the laser beam focal line (2b) and this layer thickness d of the substrate (1) is between 10 and 0.5, preferably between 5 and 2, and/or in that the ratio V2=L/D of the extent L of the portion (2c) of the induced absorption in the material, that is to say in the interior of the substrate (1), seen in the longitudinal direction of the beam, and the average extent D of the portion (2c) of the induced absorption in the material, that is to say in the interior of the substrate (1), seen transversely to the longitudinal direction of the beam, is between 5 and 5000, preferably between 50 and 500.

In some embodiments, the average diameter $\delta$ of the laser beam focal line (2b), that is to say the spot diameter, is between 0.5 μm and 5 μm, preferably between 1 μm and 3 μm, preferably is 2 μm, and/or in that the pulse duration $\tau$ of the laser (3) is chosen such that, within the time of interaction with the material of the substrate (1), the heat diffusion in this material is negligible, preferably no heat diffusion takes place, for which preferably $\tau$, $\delta$ and the heat diffusion constant $\alpha$ of the material of the substrate (1) are set according to $\tau \ll \delta^2/\alpha$ and/or preferably $\tau$ is chosen to be less than 10 ns, preferably less than 100 ps, and/or in that the pulse repetition rate of the laser (3) is between 10 kHz and 1000 kHz, preferably is 100 kHz, and/or in that the laser (3) is operated as a single-pulse laser or as a burst-pulse laser, and/or in that the average laser power, measured directly on the output side of the beam of the laser (3), is between 10 watts and 100 watts, preferably between 30 watts and 50 watts.

In certain embodiments, the wavelength $\lambda$ of the laser (3) is chosen such that the material of the substrate (1) is transparent to this wavelength or is substantially transparent, the latter being understood as meaning that the decrease in intensity of the laser beam taking place along the direction of the beam in the material of the substrate (1) per millimeter of the depth of penetration is 10% or less, the laser being, in particular for glasses or crystals that are transparent in the visible wavelength range as the substrate (1), preferably an Nd:YAG laser with a wavelength $\lambda$ of 1064 nm or a Y:YAG laser with a wavelength $\lambda$ of 1030 nm, or, in particular for semiconductor substrates (1) that are transparent in the infrared wavelength range, preferably an Er:YAG laser with a wavelength $\lambda$ of between 1.5 μm and 1.8 μm.

In some embodiments, the laser beam (2a, 2b) is directed perpendicularly onto the substrate (1), in that therefore the substrate (1) is positioned in relation to the laser beam focal line (2b) such that the induced absorption along the extended portion (2c) of the laser beam focal line (2b) takes place perpendicularly to the plane of the substrate or in that the laser beam (2a, 2b) is directed onto the substrate (1) at an angle $\beta$ of greater than 0° in relation to the normal to the plane of the substrate (1), in that therefore the substrate (1) is positioned in relation to the laser beam focal line (2b) such that the induced absorption along the extended portion (2c) of the laser beam focal line (2b) takes place at the angle 90°-$\beta$ to the plane of the substrate, where preferably $\beta \leq 45°$, preferably $\beta \leq 30°$.

In certain embodiments, the laser beam (2a, 2b) is moved in relation to the surface (1a, 4) of the substrate (1) along a line (5) along which the substrate (1) is to be severed to obtain the multiple parts, a multiplicity (2c-1, 2c-2, . . . ) of extended portions (2c) of induced absorption in the interior of the substrate (1) being produced along this line (5), where preferably the ratio $\sqrt{3}=a/\delta$ of the average spacing $a$ of directly adjacent extended portions (2c) of induced absorption, that is to say portions produced directly one after the other, and the average diameter $\delta$ of the laser beam focal line (2b), that is to say the spot diameter, is between 0.5 and 3.0, preferably between 1.0 and 2.0.

In some embodiments, during and/or after the production of the multiplicity (2c-1, 2c-2, . . . ) of extended portions (2c) of induced absorption in the interior of the substrate (1), mechanical forces are exerted on the substrate (1) and/or thermal stresses are introduced into the substrate (1), in particular the substrate is unevenly heated and cooled again, in order to bring about crack formation for separating the substrate into the multiple parts respectively between directly adjacent (2c-1, 2c-2) extended portions (2c) of induced absorption, the thermal stresses preferably being introduced by irradiating the substrate (1) with a $CO_2$ laser along the line (5).

In some embodiments, a device for the laser-based machining of a preferably sheet-like substrate (1), in order to separate the substrate into multiple parts, with which the laser beam (2a, 2b) of a laser (3) for machining the substrate (1) can be directed onto the latter, is characterized by an optical arrangement (6), which is positioned in the path of rays of the laser (3) and with which an extended laser beam focal line (2b), seen along the direction of the beam, can be formed on the beam output side of the optical arrangement (6) from the laser beam (2a) directed onto the latter, the substrate (1) being able to be positioned or being positioned in relation to the laser beam focal line (2b) such that an induced absorption takes place in the material of the substrate (1) along an extended portion (2c), seen in the direction of the beam, of the laser beam focal line (2b), with the effect that an induced crack formation is brought about in the material of the substrate along this extended portion (2c).

In certain embodiments, the optical arrangement (6) comprises a focusing optical element with spherical aberration, preferably a spherically ground convex lens (7), a diaphragm (8) of the optical arrangement (6), preferably an annular diaphragm, preferably being positioned before this focusing optical element (7) in the path of rays of the laser (3), with the effect that the bundle of rays (2aZ) lying at the center of the laser beam (2a) impinging onto the diaphragm can be blocked out, so that only the peripheral rays (2aR) lying outside this center impinge onto this focusing optical element.

In some embodiments, the optical arrangement (6) comprises an optical element with a non-spherical free surface which is shaped for forming the laser beam focal line (2b) with a defined extent 1, that is to say a defined length, seen in the direction of the beam, the optical element with the non-spherical free surface preferably being a cone prism or an axicon (9).

In certain embodiments, the optical arrangement (6) comprises in the path of rays of the laser (3) firstly a first optical element with a non-spherical free surface, which is shaped for the forming of the extended laser beam focal line (2b), preferably a cone prism or an axicon (10), and, on the beam output side of this first optical element and at the distance z1 from it, a second, focusing optical element, in particular a convex lens (11), these two optical elements preferably being positioned and aligned such that the first optical element projects the laser radiation impinging on it annularly (SR) onto the second optical element, so that the extended laser beam focal line (2b) is produced on the beam output side of the second optical element at the distance z2 from it.

In some embodiments, a third, focusing optical element, which is in particular a plano-convex collimation lens (12), is positioned between the first and second optical elements in the path of rays of the laser (3), the third optical element preferably being positioned and aligned such that the laser radiation formed annularly (SR) by the first optical element falls onto the third optical element with a defined average ring diameter dr and in that the third optical element projects the laser radiation annularly with this ring diameter dr and with a defined ring width br onto the second optical element.

The methods or devices described above can be used for separating substrates of glass, in particular of quartz, borosilicate, sapphire or soda-lime glass, sodium-containing glass, hardened glass or unhardened glass, of crystalline $Al_2O_3$, of $SiO_2.nH_2O$ (opal) or of a semiconductor material, in particular Si, GaAs, GaN, separating single- or multi-layered substrates, in particular glass-glass composites, glass-film composites, glass-film-glass composites or glass-air-glass composites, separating coated substrates, in particular metal-coated sapphire wafers, silicon wafers provided with metal or metal-oxide layers or substrates coated with ITO or AlZnO, and/or completely severing a single- or multi-layered substrate or severing one or more, but not all of the layers of a multi-layered substrate.

The laser beam focal line produced by means of the optical arrangement described above is alternatively also referred to above and below for simplicity as the focal line of the laser beam. The substrate is separated or individually separated into the multiple parts, seen in the plane of the substrate, by the crack formation (induced absorption along the focal line made to extend perpendicularly to the plane of the substrate). The crack formation consequently takes place perpendicularly to the plane of the substrate into the substrate or into the interior of the substrate (longitudinal crack formation). As already described, generally a multiplicity of individual laser beam focal lines have to be introduced into the substrate along a line on the substrate surface, in order that the individual parts of the substrate can be separated from one another. For this purpose, either the substrate may be made to move parallel to the plane of the substrate in relation to the laser beam or in relation to the optical arrangement or, conversely, the optical arrangement may be moved parallel to the plane of the substrate in relation to the fixedly arranged substrate.

The features of at least one of the dependent method or device claims are advantageously additionally realized. In this respect, the features of a number of dependent claims may also be realized in any desired combination.

In one particular aspect, the extended portion of the induced absorption in the interior of the substrate extends from a surface of the substrate to a defined depth of the substrate (or even beyond). The extended portion of the induced absorption may in this case comprise the entire depth of the substrate from one surface to the other. It is also possible to produce longitudinally extended portions of the induced absorption only in the interior of the substrate (without including the surfaces of the substrate).

Further features that can be advantageously realized can be seen in FIG. 3b further described below. The extended portion of the induced absorption (that is to say for example crack length introduced perpendicularly to the plane of the substrate) can consequently extend both from a point in the interior of the substrate along the extended portion of the induced absorption to the rear surface of the substrate or else for example from the front surfaces of the substrate to a point in the interior of the substrate. The layer thickness d is in this case respectively measured perpendicularly to the two opposite substrate surfaces of the sheet-like substrate (even in the case where the laser radiation is directed obliquely at an angle $\beta > 0°$ to the normal to the substrate surface, that is to say in the case of oblique incidence).

As used herein, the range limits mentioned in each case include the upper and lower limit values indicated.

The induced absorption is advantageously produced by means of the setting of the already described laser parameters, which are also explained below within the scope of examples, the parameters of the optical arrangement, and the geometrical parameters of the arrangement of the individual elements of the device. In principle, any desired combination of features of parameters is possible here. For instance, $\tau \ll \delta^2/\alpha$ means here that $\tau$ is less than 1%, preferably less than 1%, of $\delta^2/\alpha$. For example, the pulse duration $\tau$ may be 10 ps (or else below that), between 10 and 100 ps or else above 100 ps. For separating Si substrates, preferably an Er:YAG laser with a wavelength of between 1.5 and 1.8 μm is used. For semiconductor substrates, generally a laser with a wavelength that is chosen such that the photon energy is less than the band gap of the semiconductor is preferably used.

Advantageous radiating directions for directing the laser beam onto the substrate (which then also define the orientation of the laser beam focal line in relation to the plane of the substrate) include directing the laser beam (2a, 2b) perpendicularly onto the substrate (1), in that therefore the substrate (1) is positioned in relation to the laser beam focal line (2b) such that the induced absorption along the extended portion (2c) of the laser beam focal line (2b) takes place perpendicularly to the plane of the substrate, or directing the laser beam (2a, 2b) onto the substrate (1) at an angle $\beta$ of greater than 0° in relation to the normal to the plane of the substrate (1), in that therefore the substrate (1) is positioned in relation to the laser beam focal line (2b) such that the induced absorption along the extended portion (2c) of the laser beam focal line (2b) takes place at the angle 90°–$\beta$ to the plane of the substrate, where preferably $\beta \leq 45°$, preferably $\beta \leq 30°$.

The additional method steps that are possibly also necessary for the final separation or individual separation of the substrate into its multiple parts are described below. As already mentioned, either the substrate is moved in relation to the optical arrangement (together with the laser) or the optical arrangement (together with the laser) is moved in relation to the substrate. The crack formation should in this case (by contrast with the induced crack formation described above) be understood as meaning a transverse crack, that is to say a lateral crack formation in a direction lying in the plane of the substrate (corresponding to the path of the line along which the substrate is to be separated).

Further developments of a device, which describe in particular various possible configurational forms of the optical arrangement for producing and positioning the laser beam focal line, are described below. In this respect, also see the following exemplary embodiments and FIGS. 3a, 4, 5a, 5b, 6, 7 and 8. The convex lens may in particular be a plano-convex lens.

Main uses according to the invention (others are also described below) are described above.

A series of significant advantages in comparison with the methods and devices that are known from the prior art are described below.

Firstly, according to the invention, the formation of the cut takes place without significant particle formation, without significant melt edges, with minimal crack formation at the edge, without any significant cutting gap (consequently without loss of material of the substrate) and with straight cut edges. The formation of the cut may in this case be set either perpendicularly (seen in relation to the plane of the substrate) or at an angle $\beta$ desired by the user in relation to the normal to the substrate.

In particular, not a very high average laser power is necessary, but nevertheless comparatively high separating speeds can be achieved. It is essential in this respect that for each laser pulse (or each burst pulse) a laser beam focal line is produced (and not just a focal point of no extent, or only very local extent). The laser optics presented in further detail below are used for this purpose. The focal line thus determines the zone of interaction between the laser and the substrate. If the focal line falls at least as a portion thereof (seen in the depth direction) into the substrate material to be separated, the laser parameters can be chosen such that an interaction with the material which produces a crack zone along the entire focal line (or along the entire extended portion of the laser beam focal line that falls into the substrate) takes place. Selectable laser parameters are, for example, the wavelength of the laser, the pulse duration of the laser, the pulse energy of the laser and also possibly the polarization of the laser.

Further advantages that the method has in comparison for example with mechanical scoring and breaking are not only the absent (or at least minimal) particle formation but also, by contrast with a mechanical scoring line, that a high aspect ratio (width to depth) can be achieved. While in the case of mechanical scoring and breaking the rupture line into the material is produced by way of largely uncontrollable crack growth, according to the invention separation at a very precisely settable angle $\beta$ to the normal to the substrate takes place. Consequently, according to the invention, there is no directional dependence of the cutting direction, and oblique cuts are readily possible.

Also in comparison with producing point (focused) defects by point focusing of a laser onto the surface or else into the interior of the substrate material and subsequent breaking after setting such point focuses at different depths of the material, embodiments described herein have in particular the advantage that a much higher aspect ratio of the cut can be achieved. Problems of such known methods that occur on account of scarcely directed crack formation, in particular in the case of thicker substrates, are consequently avoided. The machining speed is also increased by a multiple, in particular in the case of thicker substrates (in the case of which it is necessary to set at a defined position in the plane of the substrate multiple points of damage at different depths of the substrate, from the upper side to the underside of the substrate).

Ablation at the surface, flash formations at the surface and particle formations are avoided (the latter in particular if the position of the focal line in relation to the substrate is set such that the extended induced absorption and crack formation from the surface of the substrate is into the interior of the substrate). In this case, the first (wanted) damage consequently takes place directly at the surface and continues in a defined way along the crack formation zone into the depth of the substrate by induced absorption.

Various materials, in particular glass sheets, sapphire sheets, semiconductor wafers, . . . can be machined. In this respect, both individual layers of corresponding materials and laminates (stacks of multiple individual substrate layers) can be machined. The focal line may in this case be positioned and aligned such that, even in the interior of a stack of layers, only a defined layer is separated. Various sandwich structures of stacks of layers can be machined: glass-air-glass composites, glass-film-glass composites, glass-glass composites. Consequently, the selective cutting of individual layers even within a stack is possible, as is the severing of intermediate layers (for example films or adhesive film).

Already coated materials (for example AR coated, TCO coated) or else substrates non-transparently printed on one side can also be machined and separated.

Free-form cuts are possible, without the geometry being restricted by the crack formation in the substrate. Consequently, virtually any desired free-form cuts can be introduced into transparent media (the cutting direction is not direction-dependent). Consequently, oblique cuts can be introduced into the substrate, for example with angles of adjustment which, on the basis of the normal, have angles of up to $\beta=30°$ or $\beta=45°$.

Cutting is possible virtually without any cutting gap: only material damage is produced, generally of an extent in the range between 1 and 10 µm. In particular, no cutting loss with respect to material or surface area is thereby generated. This is advantageous in particular when cutting semiconductor wafers, since cutting gap losses would reduce the actively usable surface area of the wafer. The method of focal line cutting described herein consequently produces an increased surface area yield. The absence of material loss is advantageous in particular also when cutting precious stones (for example diamond); though the area of use described herein is preferably the cutting or separating of sheet-like substrates, non-sheet-like substrates or workpieces can also be machined.

The method described herein may also be used in particular in the in-line operation of production processes. This takes place particularly advantageously in the case of production processes that proceed by a roll-to-roll method.

Single-pulse lasers may be used as well as lasers that generate burst pulses. In principle, the use of lasers in continuous-wave operation is also conceivable.

The following specific areas of application arise by way of example:

1. Separating sapphire LEDs with the possibility of fully or partially cutting the sapphire wafer. In this case, the metal layer may likewise be severed at the same time by the method described herein, doing so in a single step.

2. The individual separation of semiconductor wafers is possible without damaging the tape. For this purpose, the focal line is only partially taken into the interior of the substrate material, so that it begins at the surface and stops before the taped film (on the rear surface of the substrate that is facing away from the laser): for example, about 10% of the material is not separated. The film consequently remains intact because the focal line "stops" before the film. The semiconductor wafer can then subsequently be separated over the remaining 10% by way of mechanical forces (or thermal forces, see the following example with the $CO_2$ laser).

3. Cutting of coated materials: examples here are Bragg reflectors (DBR) or else metal-coated sapphire wafers. Processed silicon wafers, to which the active metal or metal-oxide layers have already been applied, can also be cut according to the invention. Other examples are the machining of ITO or AlZnO, by which substrates that are required for example for producing touchscreens or smart windows are coated. On account of the very extended focal line (in comparison with its diameter), part of the focal line will remove the metal layer (or another layer), while the rest of the focal line penetrates into the transparent material and cuts it. This also has the advantage in particular that correspondingly coated substrates can be separated in a one-step process, that is to say in a process in which the coating and the substrate are separated in one operation.

4. The cutting of very thin materials (for example substrates of glass with thicknesses of less than 300 µm, less than 100 µm or even less than 50 µm) is particularly advantageous. These materials can only be machined very laboriously by conventional mechanical methods. Indeed, in the case of the mechanical methods, edges, damage, cracks or spalling occur, which either make the substrates unusable or necessitate laborious re-working operations. By contrast, in the case of thin materials, the cutting described herein offers the advantages in particular of avoiding edge damage and cracks, so that no re-working is necessary, of very high cutting speeds (>1 m/s), of a high yield and of carrying out the process in a single step.

5. The method described herein can also be used in particular in the production of thin film glasses, which are produced by a continuously running glass-pulling process, for trimming the edges of the film.

Figure 2:
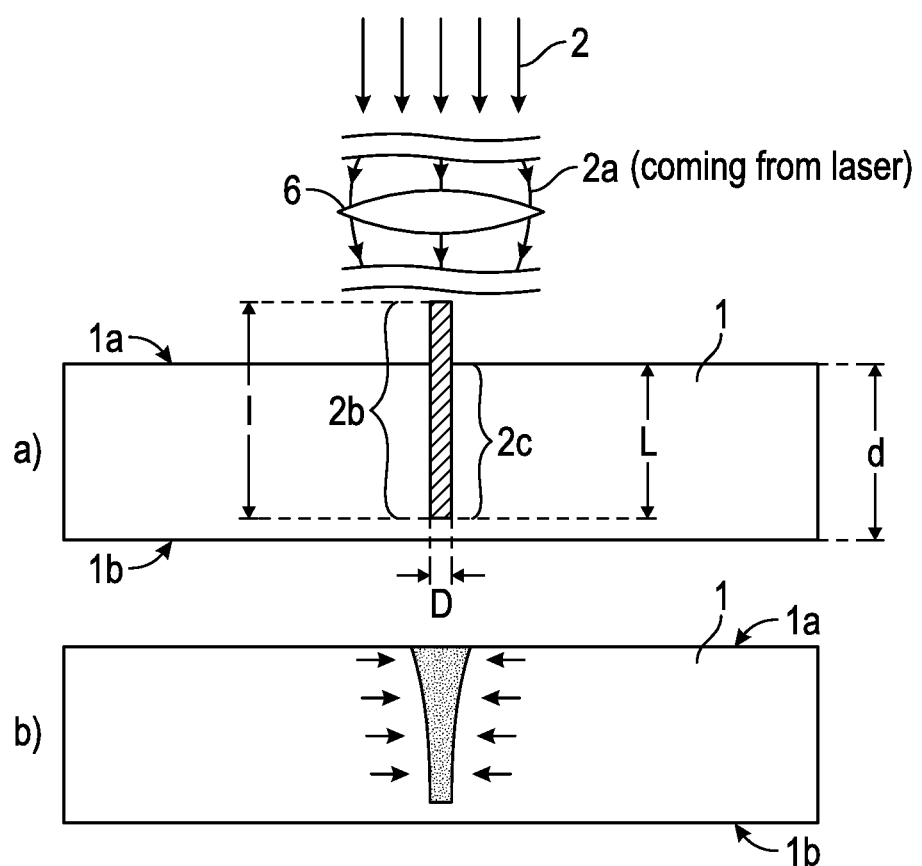
FIG. 2 shows the principle of the positioning of a focal line, that is to say the machining of a material that is transparent to the laser wavelength, on the basis of the induced absorption along the focal line.

FIG. 2 diagrammatically shows the basic procedure of the machining method according to the invention. A laser beam 2, which is emitted by the laser 3 not shown here (see FIG. 7) and is denoted on the beam input side of the optical arrangement 6 by the reference sign 2a, is directed onto the optical arrangement 6 (see the following exemplary embodiments of this). The optical arrangement 6 forms from the radiated-in laser beam on the beam output side an extended laser beam focal line 2b over a defined range of extent along the direction of the beam (length l of the focal line). The substrate 1 to be machined, here a sheet-like substrate 1, is positioned after the optical arrangement in the path of rays, at least a portion thereof coinciding with the laser beam focal line 2b of the laser radiation 2. The reference sign 1a denotes the surface of the sheet-like substrate that is facing the optical arrangement 6 or the laser, the reference sign 1b denotes the rear surface 1b of the substrate 1, at a distance from and usually parallel to said first surface. The substrate thickness (perpendicularly to the surfaces 1a and 1b, that is to say measured in relation to the plane of the substrate) is denoted here by the reference sign d.

As FIG. 2a shows, here the substrate 1 is aligned perpendicularly to the longitudinal axis of the beam and consequently to the focal line 2b produced by the optical arrangement 6 in space downstream of the same (the substrate is perpendicular to the plane of the drawing) and, seen along the direction of the beam, positioned in relation to the focal line 2b such that, seen in the direction of the beam, the focal line 2b begins before the surface 1a of the substrate and ends before the surface 1b of the substrate, that is to say still within the substrate. Consequently (with suitable laser intensity along the laser beam focal line 2b, which is ensured by the focusing of the laser beam 2 on a portion of the length l, that is to say by a line focus of the length l), the extended laser beam focal line 2b produces in the region of coincidence of the laser beam focal line 2b with the substrate 1, that is to say in the material of the substrate that is passed over by the focal line 2b, an extended portion 2c, seen along the longitudinal direction of the beam, along which an induced absorption is produced in the material of the substrate, which induces a crack formation in the material of the substrate along the portion 2c. The crack formation takes place in this case not only locally but over the entire length of the extended portion 2c of the induced absorption. The length of this portion 2c (that is to say ultimately the length of the coincidence of the laser beam focal line 2b with the substrate 1) is provided here with the reference sign L. The average diameter or the average extent of the portion of the induced absorption (or of the regions in the material of the substrate 1 that are subjected to the crack formation) is denoted here by the reference sign D. This average extent D corresponds here substantially to the average diameter δ of the laser beam focal line 2b.

As FIG. 2a shows, consequently, substrate material that is transparent to the wavelength λ of the laser beam 2 is heated by induced absorption along the focal line 2b. FIG. 2b diagrammatically shows how the heated material ultimately expands, so that a correspondingly induced stress leads to the microcrack formation, the stress being greatest at the surface 1a.

Actual optical arrangements 6 that can be used for producing the focal line 2b, and also an actual optical setup (FIG. 7), in which these optical arrangements can be used, are described below. All of the arrangements and setups are based here on the descriptions given above, so that identical reference signs are used in each case for components or features that are identical or correspond in their function. Therefore, only the differences are respectively described below.

Since the separating surface ultimately leading to the separation is, or is intended to be, of high-quality (with regard to rupture strength, the geometrical precision, roughness and the avoidance of re-working requirements), the individual focal lines to be positioned along the separating line 5 on the surface of the substrate should be produced as described with the following optical arrangements (the optical arrangement is alternatively also referred to hereinafter as laser optics). The roughness results here in particular from the spot size or the spot diameter of the focal line. In order with a given wavelength λ of the laser 3 (interaction with the material of the substrate 1) to be able to achieve a small spot size, of for example 0.5 µm to 2 µm, generally certain requirements have to be imposed on the numerical aperture of the laser optics 6. These requirements are satisfied by the laser optics 6 described below.

To achieve the desired numerical aperture, on the one hand the optics must have the necessary aperture at a given focal length, according to the known formulae given by Abbé (N.A.=n sin (theta), n: refractive index of the glass to be machined, theta: half the angular aperture; and theta=arctan (D/2 f); D: aperture, f: focal length). On the other hand, the laser beam must illuminate the optics up to the necessary aperture, which is typically accomplished by beam expansion by means of expansion telescopes between the laser and the focusing optics.

The spot size should at the same time not vary too much, for a uniform interaction along the focal line. This can be ensured for example (see exemplary embodiment below) by the focusing optics only being illuminated in a narrow, annular region, in that then of course the beam aperture, and consequently the numerical aperture, change only by a small amount in percentage terms.

Figure 3A:
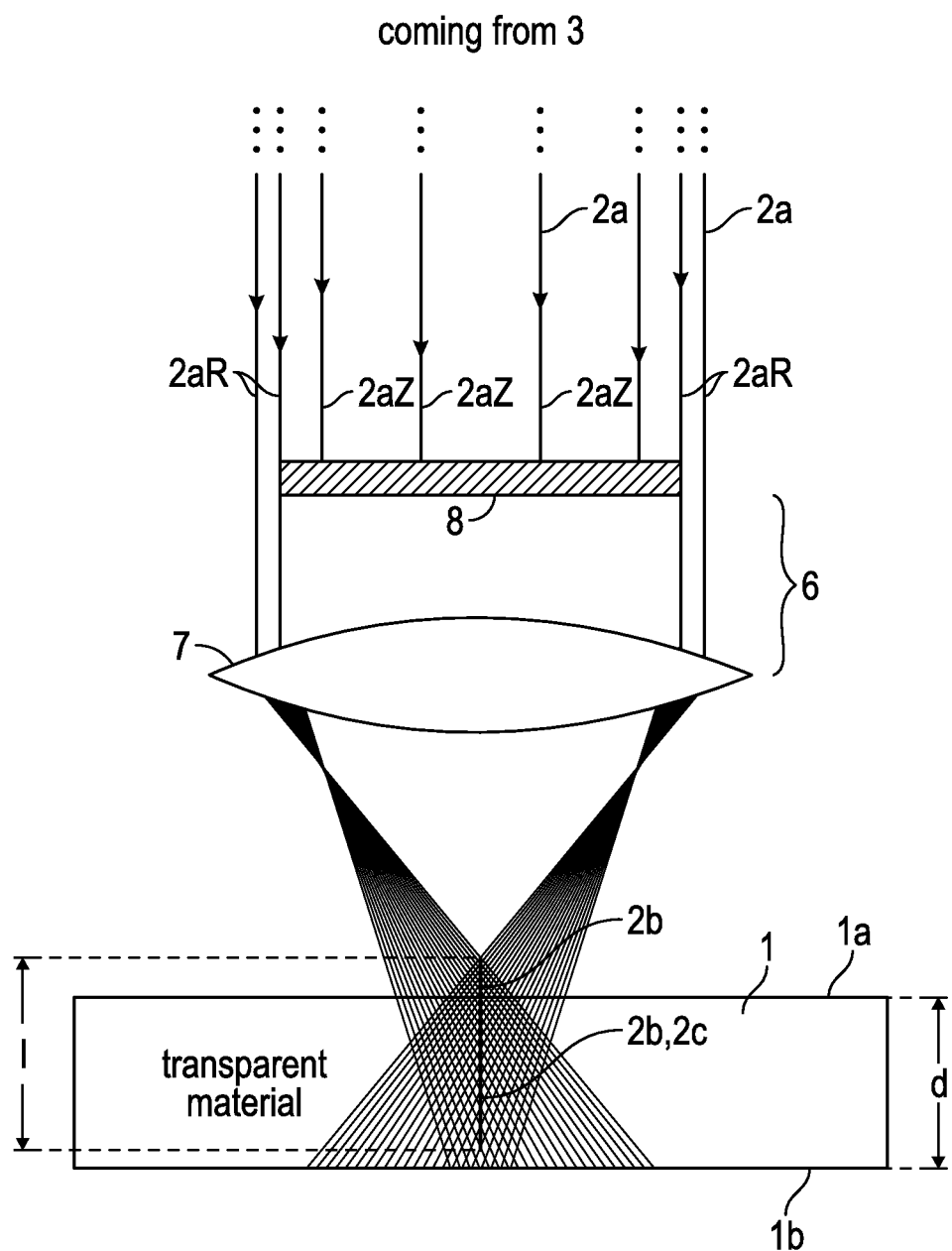
FIG. 3a shows a first optical arrangement that can be used in embodiments described herein.

According to FIG. 3a (section perpendicularly to the plane of the substrate at the height of the central ray in the bundle of laser rays of the laser radiation 2; here, too, the radiating in of the laser beam 2 takes place perpendicularly to the plane of the substrate, i.e. the angle β is 0°, so that the focal line 2b or the extended portion of the induced absorption 2c is parallel to the normal to the substrate), the laser radiation 2a emitted by the laser 3 is initially directed onto a circular diaphragm 8, which is completely nontransparent to the laser radiation used. The diaphragm 8 is in this case oriented perpendicularly to the longitudinal axis of the beam and centered on the central ray of the bundle of rays 2a shown. The diameter of the diaphragm 8 is chosen such that the bundles of rays lying close to the center of the bundle of rays 2a or the central ray (denoted here by 2aZ) impinge on the diaphragm and are completely absorbed by it. Only rays lying in the outer peripheral region of the bundle of rays 2a (peripheral rays, denoted here by 2aR) are not absorbed on account of the reduced diaphragm size in comparison with the beam diameter, but pass by the diaphragm 8 laterally and impinge on the peripheral regions of the focusing optical element of the optical arrangement 6, formed here as a spherically ground, biconvex lens 7.

The lens 7, centered on the central ray, is deliberately formed here as a non-corrected, biconvex focusing lens in the form of a customary spherically ground lens. In other words, the spherical aberration of such a lens is deliberately utilized. As an alternative to this, aspheric lenses or multi-lens systems that deviate from ideally corrected systems and specifically do not form an ideal focal point but a definite, elongated focal line of a defined length may also be used (that is to say lenses or systems that specifically no longer have a single focal point). The zones of the lens consequently focus specifically in dependence on the distance from the center of the lens along a focal line 2b. Here, the diameter of the diaphragm 8 transversely to the direction of the beam is approximately 90% of the diameter of the bundle of rays (the diameter of the bundle of rays is defined by the extent up to decay to 1/e) and about 75% of the diameter of the lens of the optical arrangement 6. Consequently, the focal line 2b of a non-aberration-corrected spherical lens 7 that has been produced by blocking out the bundle of rays in the middle is used herein. The section in a plane through the central ray is represented; the complete three-dimensional bundle is obtained when the rays represented are rotated about the focal line 2b.

A disadvantage of this focal line is that the conditions (spot size, intensity of the laser) change along the focal line, and consequently along the desired depth in the material, and consequently the desired type of interaction (no significant melting, induced absorption, thermal-plastic deformation up to crack formation) can possibly only be set within part of the focal line. This conversely means that possibly only part of the radiated-in laser light is absorbed in the way desired. Consequently, on the one hand the efficiency of the method (necessary average laser power for the desired separating speed) is impaired, on the other hand under some circumstances laser light is transmitted to undesired, deeper-lying locations (parts or layers adhering to the substrate, or to the substrate holder) and interacts there in an undesired way (heating, dispersion, absorption, undesired modification).

Figure 3B:
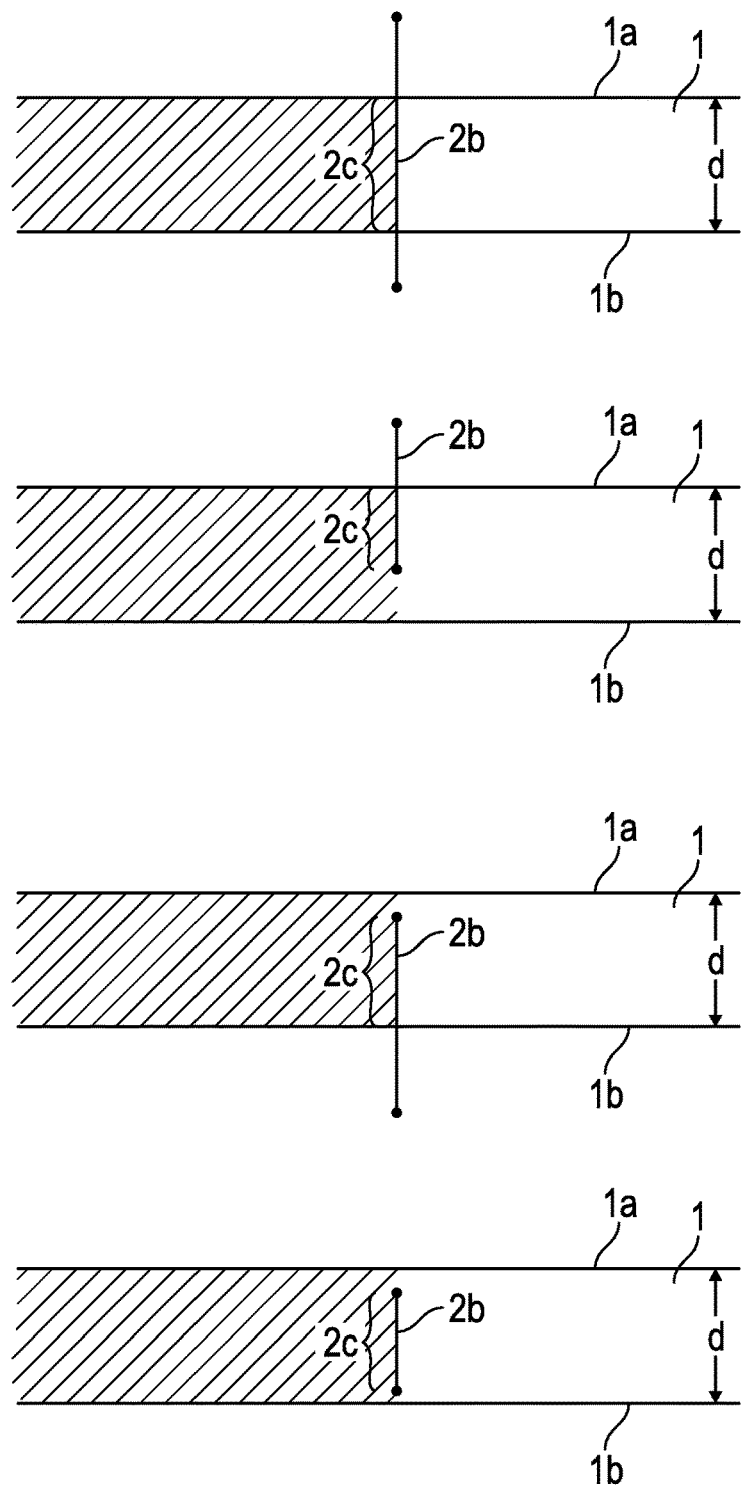
FIG. 3b shows various possible ways of machining the substrate by different positioning of the laser beam focal line in relation to the substrate.

FIG. 3b shows (not only for the optical arrangement in FIG. 3a, but in principle also for all other optical arrangements 6 that can be used) that the laser beam focal line 2b can be positioned variously by suitable positioning and/or alignment of the optical arrangement 6 in relation to the substrate 1 and by suitable choice of the parameters of the optical arrangement 6: as the first line from FIG. 3b diagrammatically shows, the length l of the focal line 2b may be set such that it exceeds the substrate thickness d (here by a factor of 2). Consequently, if the substrate 1 is placed centrally in relation to the focal line 2b, seen in the longitudinal direction of the beam, an extended portion of induced absorption 2c is produced over the entire substrate thickness d.

In the case shown in the second line in FIG. 3b, a focal line 2b of the length l that corresponds approximately to the extent of the substrate d is produced. Since the substrate 1 is positioned in relation to the line 2 such that the line 2b begins at a point before, that is to say outside, the substrate, the length L of the extended portion of induced absorption 2c (which extends here from the surface of the substrate to a defined depth of the substrate, but not as far as the rear surface 1b) is less here than the length l of the focal line 2b. The third line in FIG. 3b shows the case in which the substrate 1 is positioned partially before the beginning of the focal line 2b, seen along the direction of the beam, so that here, too, l>L applies for the length l of the line 2b (L=extent of the portion of induced absorption 2c in substrate 1). The focal line consequently begins in the interior of the substrate and extends beyond the rear surface 1b to outside the substrate. The fourth line in FIG. 3b finally shows the case in which the focal line length l produced is less than the substrate thickness d, so that—with central positioning of the substrate in relation to the focal line seen in the direction of irradiation—the focal line begins here close to the surface 1a in the interior of the substrate and ends close to the surface 1b in the interior of the substrate (l=0.75·d).

It is particularly advantageous here to realize the focal line positioning such that at least one of the surfaces 1a, 1b is passed over by the focal line; the portion of the induced absorption 2c consequently begins at least one surface. In this way, virtually ideal cuts can be achieved by avoiding ablation, flash and particle formation at the surface.

Figure 4:
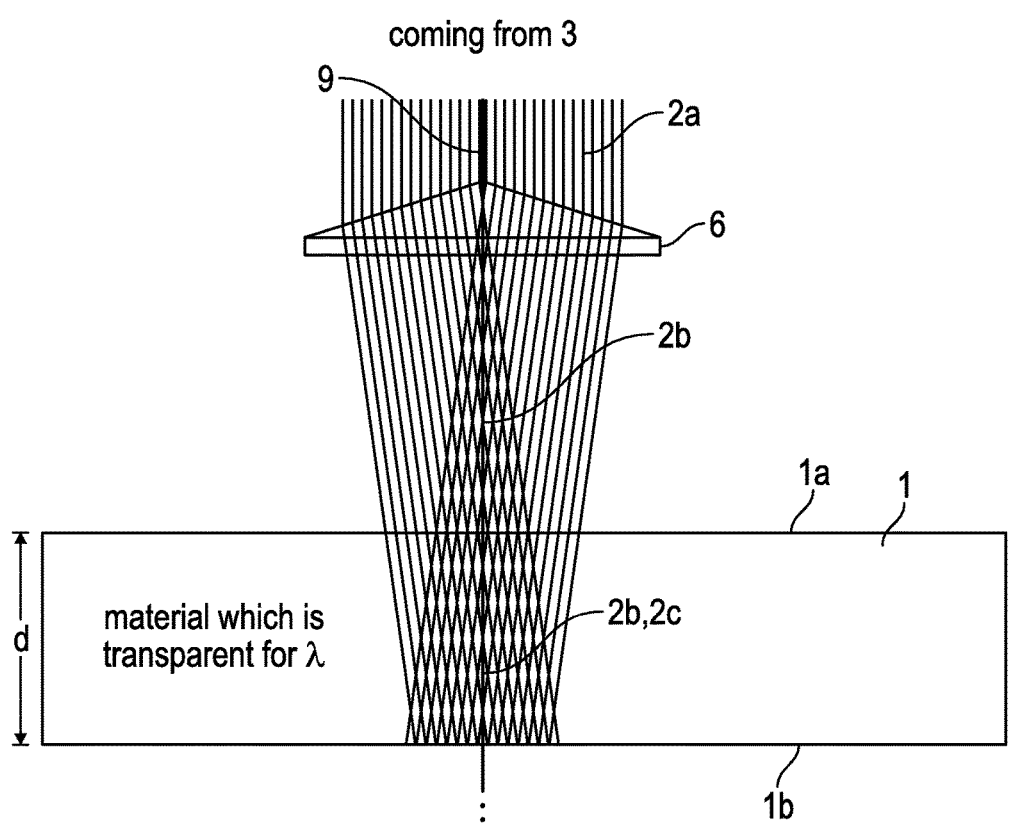
FIG. 4 shows a second optical arrangement that can be used in embodiments described herein.

FIG. 4 shows a further optical arrangement 6 that can be used. The basic setup follows that described in FIG. 3a, so that only the differences are described below. The optical arrangement shown is based on the idea of using optics with a non-spherical free surface which is shaped such that a focal line of a defined length l is formed for the formation of the focal line 2b. For this purpose, aspheric lenses may be used as optical elements of the optical arrangement 6. For example, in FIG. 4, a so-called cone prism, which is often also referred to as an axicon, is used. An axicon is a special, conically ground lens that forms a point source on a line along the optical axis (or else annularly transforms a laser beam). The setup of such an axicon is known in principle to a person skilled in the art. Here, the cone angle is for example 10°. The axicon denoted here by the reference sign 9 is aligned with its cone tip counter to the direction of irradiation and centered on the center of the beam. Since the focal line 2b of the axicon 9 already begins within the same, the substrate 1 (which is arranged here perpendicularly to the axis of the principal ray) may be positioned in the path of rays directly after the axicon 9. As FIG. 4 shows, on account of the optical properties of the axicon, a displacement of the substrate 1 along the direction of the beam is also possible without it leaving the region of the focal line 2b. The extended portion of the induced absorption 2c in the material of the substrate 1 consequently extends over the entire substrate depth d.

However, the setup shown has the following restrictions: since the focal line of the axicon 9 already begins within the lens, with a finite working distance between the lens and the material, a significant part of the laser energy is not focused into the part 2c of the focal line 2b that lies in the material. Furthermore, with the available refractive index and cone angles of the axicon 9, the length l of the focal line 2b is linked to the beam diameter, for which reason, in the case of relatively thin materials (a few millimeters), the focal line is altogether too long, as a result of which in turn the laser energy cannot be specifically focused into the material.

Figure 5A:
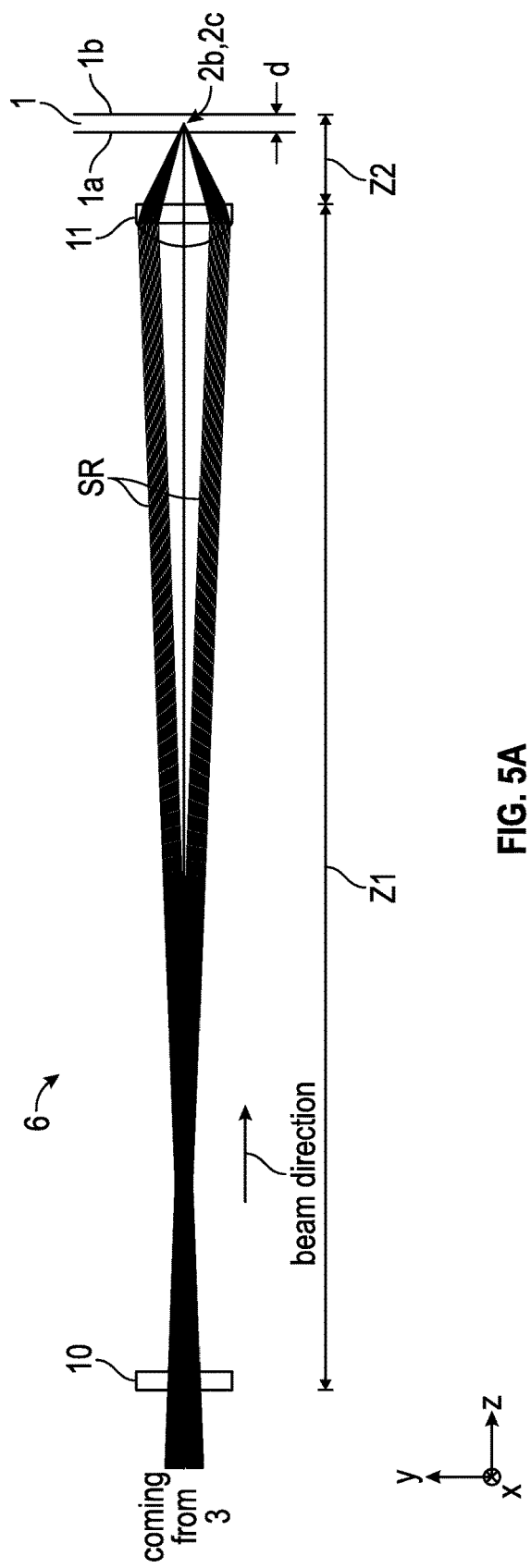
FIGS. 5a and 5b show a third optical arrangement that can be used in embodiments described herein.

For this reason, an improved optical arrangement 6 is obtained if it comprises both an axicon and a focusing lens. FIG. 5a shows such an optical arrangement 6, in which there is positioned on the path of rays of the laser 3, seen along the direction of the beam, firstly a first optical element with a non-spherical free surface, which is shaped for the forming of an extended laser beam focal line 2b. In the case shown, this first optical element is an axicon 10 with a 5° cone angle, which is positioned perpendicularly to the direction of the beam and centered on the laser beam 3. The cone tip of the axicon in this case points counter to the direction of the beam. Positioned at the distance z1 from the axicon 10 in the direction of the beam is a second, focusing optical element, here a plano-convex lens 11 (the convexity of which faces toward the axicon). The distance z1 is chosen here to be about 300 mm, such that the laser radiation formed by the axicon 10 impinges in an annular manner on the outer regions of the lens 11. The lens 11 focuses the annularly impinging radiation on the beam output side onto a focal line 2b of a defined length, of here 1.5 mm, at the distance z2, of here about 20 mm, from the lens 11. Here, the effective focal length of the lens 11 is 25 mm. The annular transformation of the laser beam by the axicon 10 is provided here with the reference sign SR.

Figure 5B:
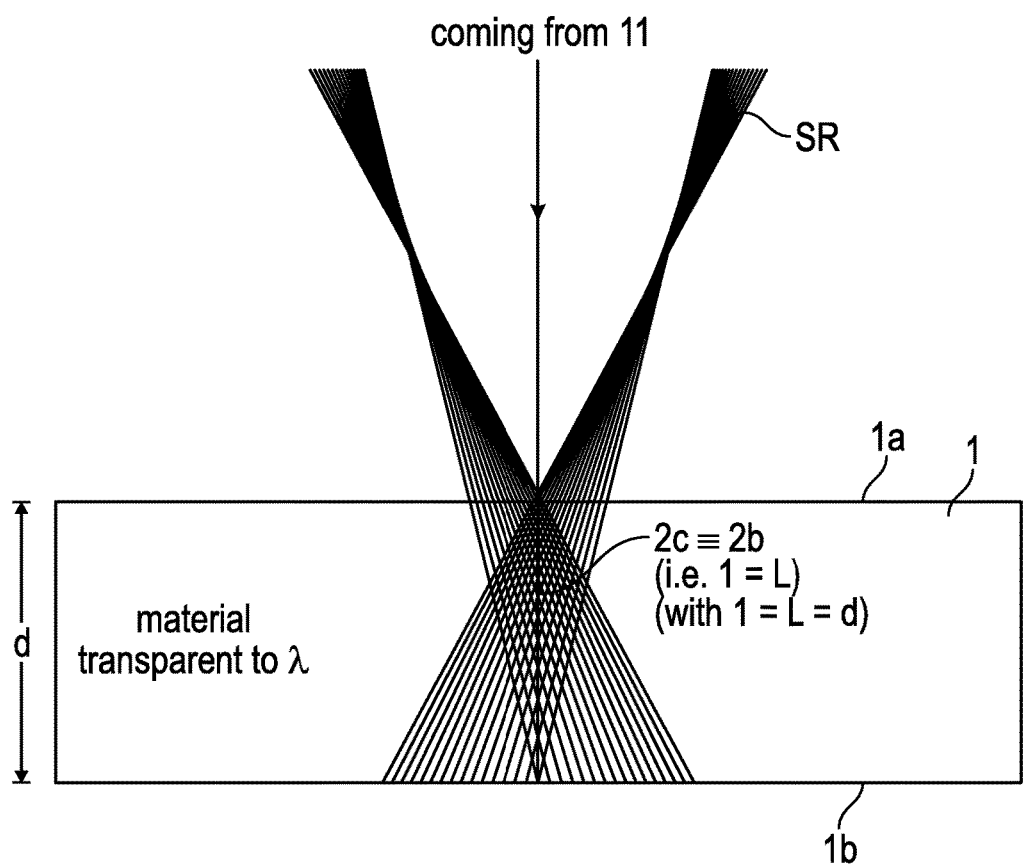

FIG. 5b shows in detail the formation of the focal line 2b and of the induced absorption 2c in the material of the substrate 1 according to FIG. 5a. The optical properties of the two elements 10, 11 and the positioning of the same here are such that the extent 1 of the focal line 2b in the direction of the beam coincides exactly with the thickness d of the substrate 1. Accordingly, an exact positioning of the substrate 1 along the direction of the beam is necessary in order to position the focal line 2b exactly between the two surfaces 1a and 1b of the substrate 1, as shown in FIG. 5b.

It is consequently advantageous if the focal line is formed at a certain distance from the laser optics, and the large part of the laser radiation is focused up to a desired end of the focal line. As described, this can be achieved by a mainly focusing element 11 (lens) only being illuminated annularly on a desired zone, whereby on the one hand the desired numerical aperture is realized, and consequently the desired spot size, but on the other hand, after the desired focal line 2b, the circle of least diffusion loses intensity after a very short distance in the middle of the spot, since a substantially annular spot forms. Consequently, the crack formation is stopped within a short distance at the desired depth of the substrate. A combination of the axicon 10 and the focusing lens 11 satisfies this requirement. Here, the axicon 10 acts in two ways: a usually round laser spot is sent by the axicon 10 annularly onto the focusing lens 11 and the asphericity of the axicon 10 has the effect that, instead of a focal point in the focal plane of the lens, a focal line forms outside the focal plane. The length l of the focal line 2b can be set by way of the beam diameter on the axicon. The numerical aperture along the focal line can in turn be set by way of the distance z1 between the axicon and the lens and by way of the cone angle of the axicon. In this way, the entire laser energy can consequently be concentrated in the focal line.

If the crack formation is intended to stop before the exit side of the substrate, the annular illumination still has the advantage that on the one hand the laser power is used in the best possible way, since a large part of the laser light remains concentrated in the desired length of the focal line, on the other hand, due to the annular illuminated zone together with the desired aberration set by the other optical functions, a uniform spot size along the focal line can be achieved, and consequently a uniform separating process along the focal line can be achieved.

Instead of the plano-convex lens shown in FIG. 5a, a focusing meniscus lens or some other higher corrected focusing lens (aspheric lens, multilens system) may also be used.

To produce very short focal lines 2b with the combination shown in FIG. 5a of an axicon and a lens, very small beam diameters of the laser beam incident on the axicon would have to be chosen. This has the practical disadvantage that the centering of the beam on the tip of the axicon must be very exact, and therefore the result is very sensitive to directional fluctuations of the laser (beam drift stability). Furthermore, a narrowly collimated laser beam is very divergent, i.e. the bundle of rays scatters again over short distances on account of the diffraction of light.

Both can be avoided by inserting a further lens, a collimation lens 12 (FIG. 6): this further positive lens 12 allows the annular illumination of the focusing lens 11 to be set very narrowly. The focal length f' of the collimation lens 12 is chosen such that the desired ring diameter dr is obtained when there is a distance z1a from the axicon to the collimation lens 12 that is equal to f'. The desired width br of the ring can be chosen by way of the distance z1b (collimation lens 12 to focusing lens 11). Purely geometrically, a short focal line then follows from the small width of the annular illumination. A minimum is in turn achieved at the distance f'.

Figure 6:
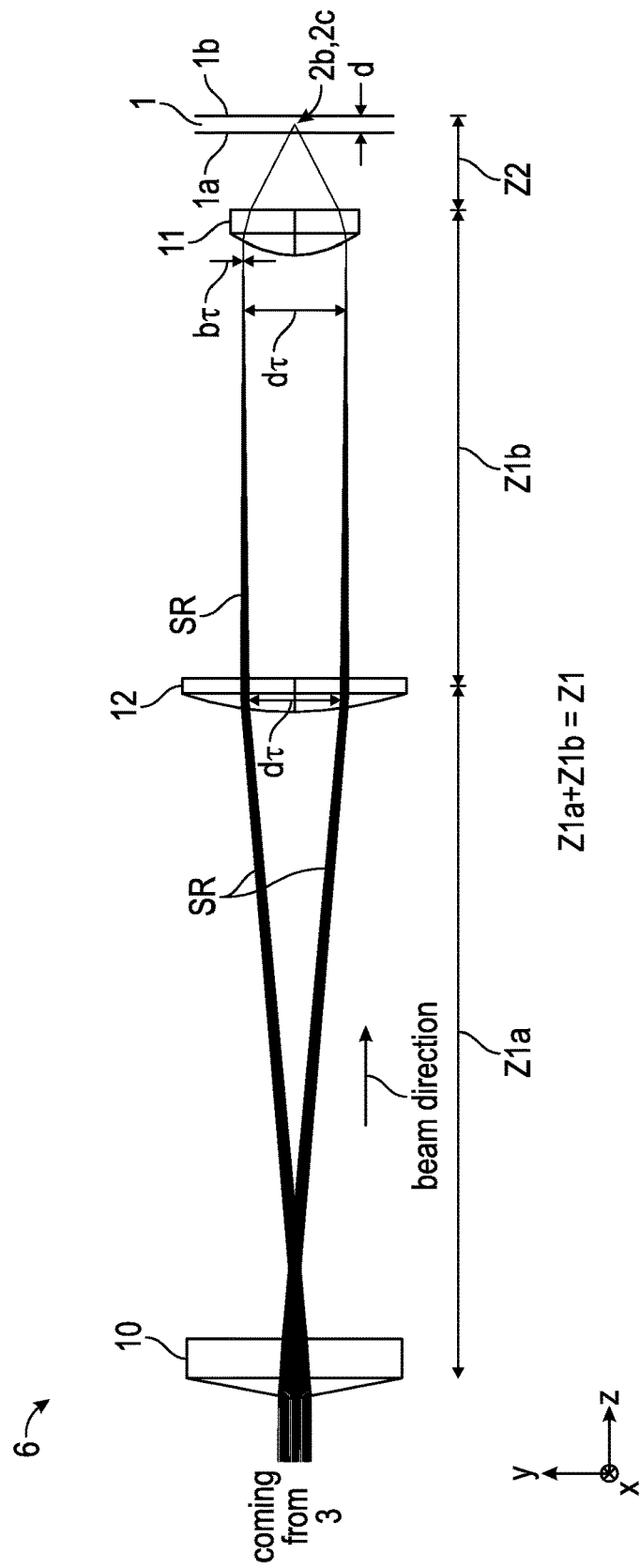
FIG. 6 shows a fourth optical arrangement that can be used in embodiments described herein.

The optical arrangement 6 shown in FIG. 6 is consequently based on that shown in FIG. 5a, so that only the differences are described below. In addition, the collimation lens 12, which is likewise formed here as a plano-convex lens (with its convexity pointing counter to the direction of the beam), has been introduced here centrally into the path of rays between the axicon 10 (which is arranged here with its cone tip counter to the direction of the beam) on the one hand and the plano-convex lens 11 on the other hand. The distance of the collimation lens 12 from the axicon 10 is denoted here by z1a, the distance of the focusing lens 11 from the collimation lens 12 is denoted by z1b and the distance of the focal line 2b produced from the focusing lens 11 is denoted by z2 (seen in each case in the direction of the beam). As FIG. 6 shows, the annular radiation SR that is formed by the axicon and incident upon the collimation lens 12 in a divergent manner and with the ring diameter dr, has the ring diameter dr remaining at least approximately constant along the distance z1b and is set to the desired ring width br at the location of the focusing lens 11. In the case shown, a very short focal line 2b is intended to be produced, so that the ring width br of about 4 mm at the location of the lens 12 is reduced by the focusing properties of the latter at the location of the lens 11 to about 0.5 mm (ring diameter dr here for example 22 mm).

In the example represented, with a typical beam diameter from the laser of 2 mm, with a focusing lens 11 of f=25 mm focal length and a collimation lens of f'=150 mm focal length, a length of the focal line 1 of below 0.5 mm can be achieved. Furthermore, Z1a=Z1b=140 mm and Z2=15 mm.

Figure 7:
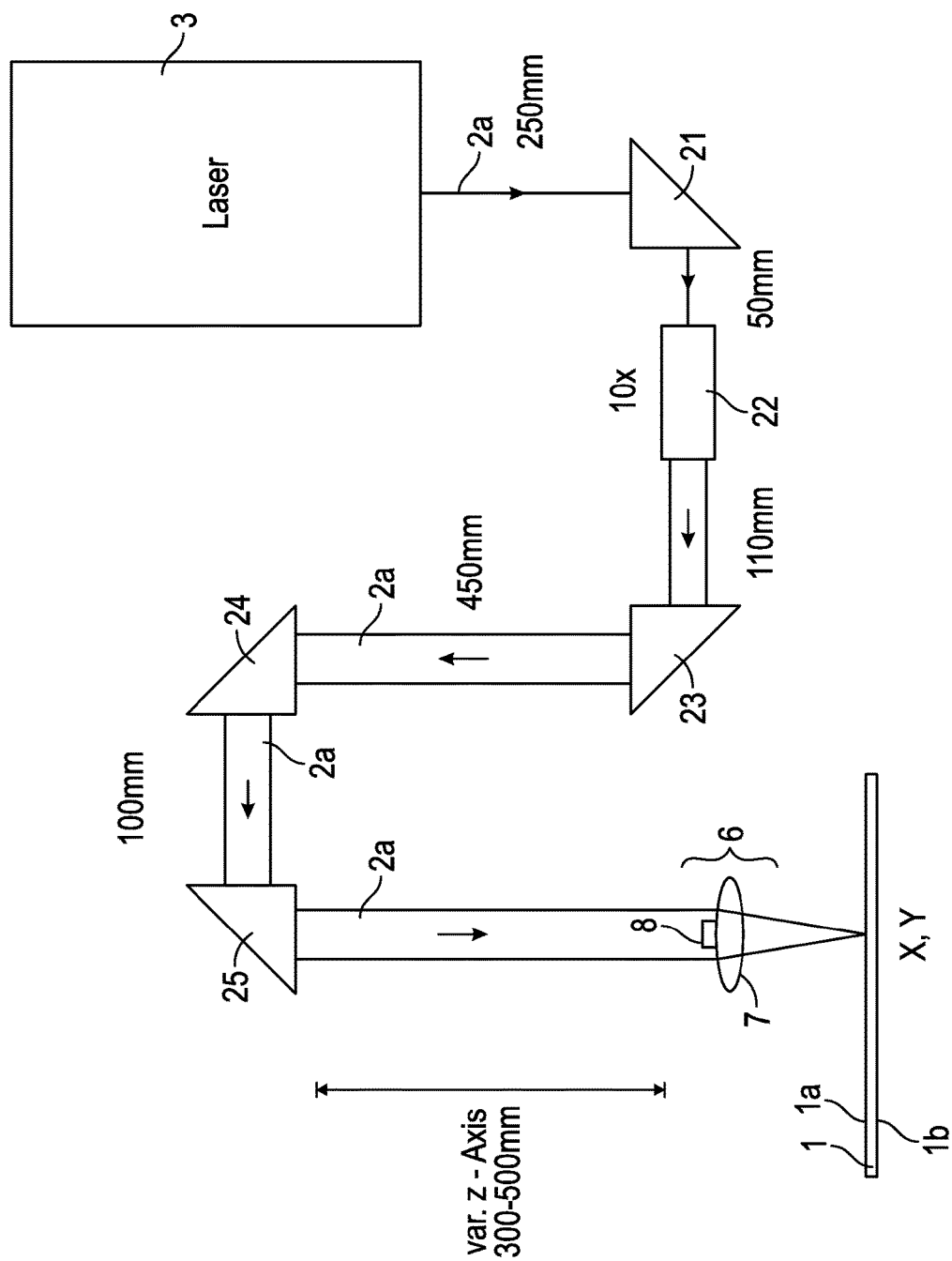
FIG. 7 shows a setup for carrying out the method in the example of the first usable optical arrangement from FIG. 3a (instead of this optical arrangement, the further optical arrangements shown in FIGS. 4, 5 and 6 may also be used within the scope of the arrangement shown, in that the optical arrangement 6 shown in FIG. 7 is replaced by one of these arrangements).
Figure 8:
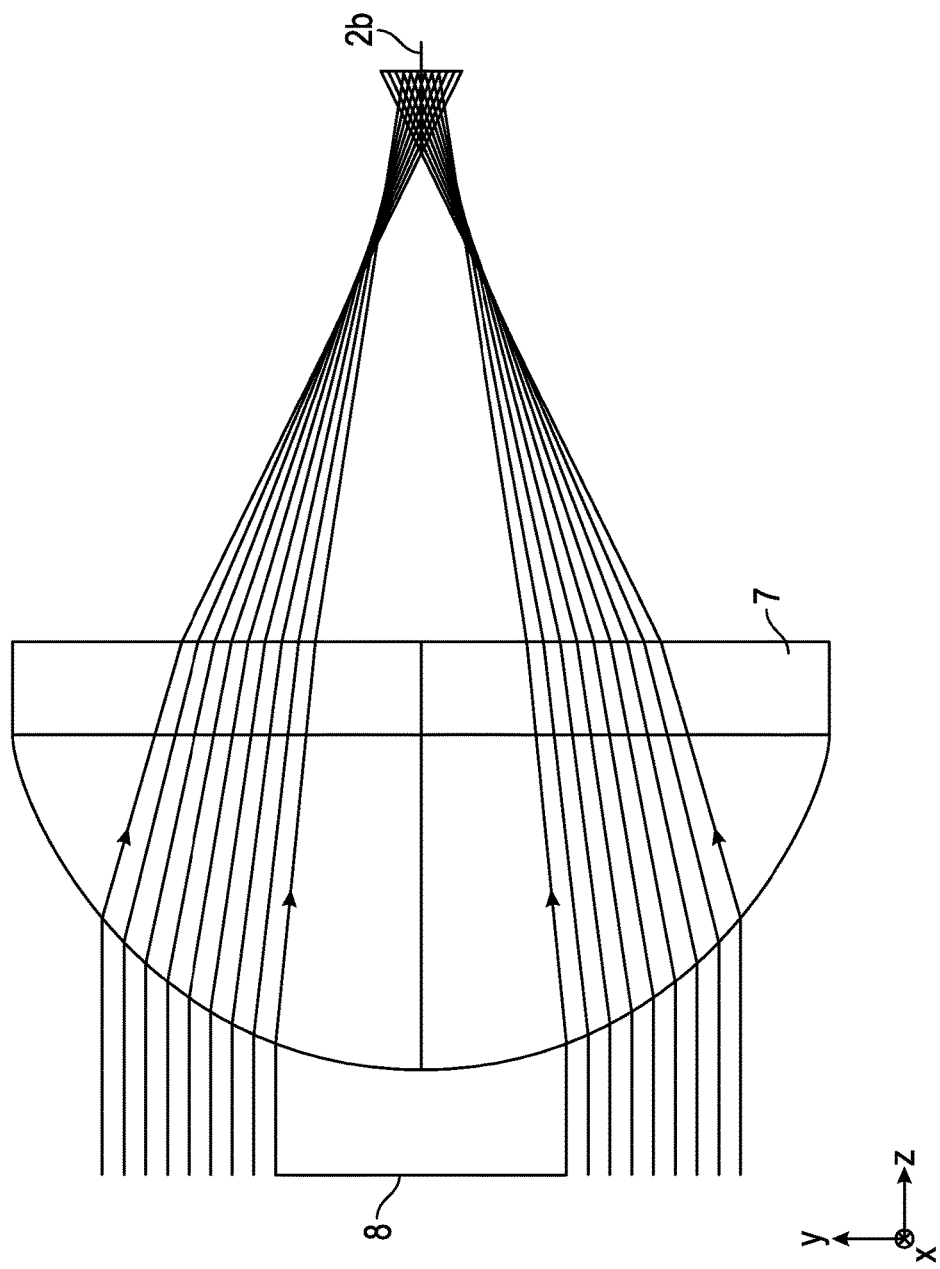
FIG. 8 shows the production of a focal line in detail.

An example of the severing of unhardened glass with an optical arrangement according to FIG. 3a in a setup according to FIG. 7 is given below (instead of the optical arrangement 6 shown in FIG. 3a, the other optical arrangements 6 described above may also be used in the setup according to FIG. 7, in that the diaphragm-lens combination 8, 7 shown there is correspondingly replaced).

Borosilicate or soda-lime glasses 1 without other colorations (in particular with a low iron content) are optically transparent from about 350 nm to about 2.5 μm. Glasses are generally poor heat conductors, for which reason even laser pulse durations of a few nanoseconds do not allow any significant heat diffusion out of a focal line 2b. Nevertheless, even shorter laser pulse durations are advantageous, since with sub-nanosecond or picosecond pulses a desired induced absorption can be achieved more easily by way of nonlinear effects (intensity much higher).

Suitable for example for severing flat glasses is a commercially available picosecond laser 3, which has the following parameters: wavelength 1064 nm, pulse duration of 10 picoseconds, pulse repetition rate of 100 kHz, average power (measured directly after the laser) of up to 50 W. The laser beam initially has a beam diameter (measured at 13% of the peak intensity, i.e. $1/e^2$ diameter of a Gaussian bundle of rays) of about 2 mm, the beam quality is at least $M^2<1.2$ (determined in accordance with DIN/ISO 11146). With beam expanding optics 22 (commercially available Kepler beam telescope), the beam diameter is increased by a factor of 10 to about 20-22 mm (21, 23, 24 and 25 are beam-deflecting mirrors). With a so-called annular diaphragm 8 of 9 mm in diameter, the inner part of the bundle of rays is cut off, so that an annular beam forms. With this annular beam, a plano-convex lens 7 with a 28 mm focal length (quartz glass with a radius of 13 mm) is illuminated for example. The strong (desired) spherical aberration of the lens 7 has the effect of producing the focal line. See in this respect not only FIG. 7 but also FIG. 8, which diagramatically shows the production of the focal line 2b from the peripheral rays by the lens 7.

The theoretical diameter δ of the focal line varies along the axis of the beam, and is therefore advantageous for producing a homogeneous crack surface if the substrate thickness d here is smaller than about 1 mm (typical thicknesses for display glasses are 0.5 mm to 0.7 mm) A spot size of about 2 μm and a spacing from spot to spot of 5 μm give a speed at which the focal line can be passed 5 over the substrate 1 (see FIG. 9) of 0.5 m/sec. With an average power on the substrate of 25 W (measured after the focusing lens 7), the pulse repetition rate of 100 kHz gives a pulse energy of 250 μJ, which may also take place in a structured pulse (rapid sequence of single pulses at intervals of only 20 ns, known as a burst pulse) of 2 to 5 sub-pulses.

Unhardened glasses have substantially no internal stresses, for which reason, without any external action, the zone of disturbance, which is still interlinked and connected by unseparated bridges, at first still holds the parts together here. If, however, a thermal stress is introduced, the substrate separates completely, and without any further force being introduced externally, along the lasered rupture surface 5. For this purpose, a $CO_2$ laser with an average power of up to 250 W is focused onto a spot size of about 1 mm, and this spot is passed over the separating line 5 at up to 0.5 m/s. The local thermal stress due to the laser energy introduced (5 J per cm of the separating line 5) separates the workpiece 1 completely.

For separating thicker glasses, the threshold intensity for the process (induced absorption and formation of a zone of disturbance by thermal shock) must of course be reached over a longer focal line 1. Higher necessary pulse energies and higher average power outputs consequently follow. With the optics setup described above and the maximum laser power available (after losses through optics) of 39 W on the substrate, the severing of glass about 3 mm thick is successfully achieved. In this case, on the one hand the annular diaphragm 8 is removed, and on the other hand the distance of the lens 7 from the substrate is corrected (increased in the direction of nominal focal distance) such that a longer focal line is produced in the substrate.

A further exemplary embodiment of severing hardened glass (likewise with the device shown in FIGS. 3a and 7) is presented below.

Sodium-containing glasses are hardened, in that sodium is exchanged for potassium at the surface of the glass by immersion in baths of liquid potassium salt. This leads to a considerable internal stress (compressive stress) in a layer 5-50 μm thick at the surfaces, which in turn leads to the greater stability.

In principle, the process parameters when severing hardened glasses are similar to those for unhardened glasses of comparable dimensions and composition. However, the hardened glass can break very much more easily due to the internal stress, specifically due to undesired crack growth, which does not take place along the lasered intended rupture surface 5, but into the material. Therefore, there is a narrower parameter field for the successful severing of a specific hardened glass. In particular, the average laser power and the associated cutting speed must be maintained very precisely, specifically in dependence on the thickness of the hardened layer. For a glass with a hardened layer 40 μm thick and a total thickness of 0.7 mm, the following parameters are obtained for example in the case of the aforementioned setup: a cutting speed of 1 m/s at a pulse repetition rate of 100 kHz, and therefore a spot spacing of 10 μm, with an average power of 14 W.

The internal stress of the hardened glasses has the effect that the rupture zone 5 forms completely after a little time (a few seconds), and the substrate is separated into the desired parts.

Very thin hardened glasses (<100 μm) consist predominantly of toughened material, i.e. the front and rear sides are reduced in their sodium content, and consequently hardened, in each case by for example 30 μm, and only 40 μm in the interior are unhardened. This material breaks very easily and completely if one of the surfaces is damaged. It has so far not been possible in the prior art for such hardened glass films to be machined.

The severing of this material by the method described herein is successfully achieved if a) the diameter of the focal line is very small, for example less than 1 μm, b) the spacing from spot to spot is small, for example between 1 and 2 μm, and c) the separating speed is high enough for the crack growth not to get ahead of the laser process (high laser pulse repetition rate of for example 200 kHz at 0.2 to 0.5 m/s).

A further exemplary embodiment (likewise with the device described in FIGS. 3a and 7) for severing sapphire glass and crystalline sapphire is presented below.

Sapphire crystals and sapphire glasses are glasses which, though optically similar (transparency and refractive index), behave very differently mechanically and thermally. For instance, sapphire is an excellent heat conductor, can withstand extreme mechanical loading and is very hard and scratch-resistant. Nevertheless, with the laser and optics setup described above, thin (0.3 mm to 0.6 mm) sapphire crystals and glasses can be severed. Because of the great mechanical stability, it is particularly important that the remaining bridges between the parts to be separated are minimized, since otherwise very high forces are required for ultimate separation. The zone of disturbance must be formed as completely as possible from the entry surface 1a to the exit surface 1b of the substrate. As in the case of thicker glasses, this can be achieved with higher pulse energy, and consequently higher average laser power. Furthermore, crystalline sapphire is birefringent. The cutting surface must lie perpendicularly to the optical axis (so-called C-cut). For severing a crystalline sapphire wafer of 0.45 mm in thickness, the following parameters can be used: an average laser power of 30 W at a pulse repetition rate of 100 kHz, a spot size of 2 μm, and a spot spacing of 5 μm, which corresponds to a cutting speed of 0.5 m/s at the pulse repetition rate mentioned. As in the case of glass, complete separation may require subsequent heating of the cutting line 5 to be carried out, for example with a $CO_2$ laser spot, in order that the thermal stress is used to make the zone of disturbance go through crack growth to form a complete, continuous, non-interlinked separating surface.

Figure 9:
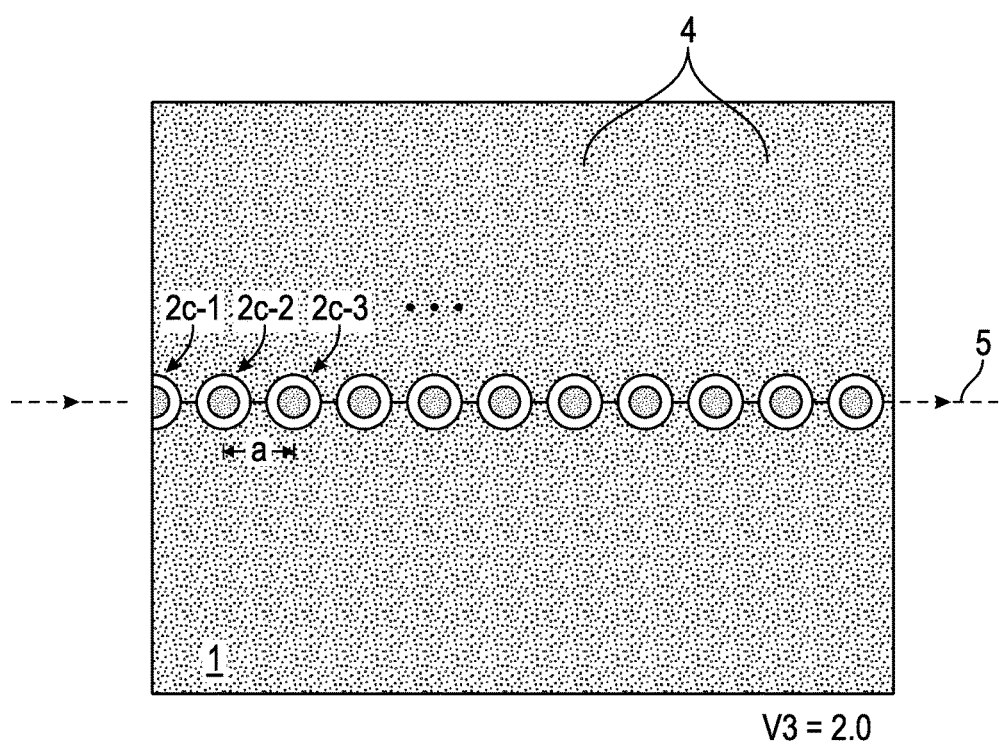
FIG. 9 shows a micrograph of the surface (plan view of the plane of the substrate) of a glass sheet machined as described herein.

FIG. 9 finally shows a micrograph of the surface of a glass sheet machined as described herein. The individual focal lines or extended portions of induced absorption 2c, which are provided here with the reference signs 2c-1, 2c-2 . . . (into the depth of the substrate perpendicularly to the surface represented), are joined together along the line 5, along which the laser beam has been passed over the surface 4 of the substrate, by crack formation to form a separating surface for the separation of the parts of the substrate. The multiplicity of individual extended portions of induced absorption can be seen well, in the case shown the pulse repetition rate of the laser having been made to match the rate of the advancement for moving the laser beam over the surface 4 such that the ratio V3=a/δ of the average spacing a of directly adjacent portions 2c-1, 2, 2c-2 . . . and the average diameter δ of the laser beam focal line is approximately 2.0.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

The teachings of all patents, published applications and references cited herein are incorporated by reference in their entirety.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method comprising:
   focusing a pulsed laser beam into a laser beam focal line, viewed along the beam propagation direction, the laser beam focal line having a length in a range of between 0.1 mm and 100 mm;
   directing the laser beam focal line into a material at an angle of incidence to a surface of the material, the laser beam focal line generating an induced absorption within the material, the induced absorption producing a material modification along the laser beam focal line within the material, and
   wherein
   said laser beam is a burst pulse laser beam, with each burst pulse comprising a plurality of pulses;
   the laser beam has an average laser pulse energy measured at the material less than about 400 µJ; and
   the laser beam causes local heating of the material along the focal line and the local heating results in crack formation along the focal line as a result of the thermal stress introduced into the material, without significant ablation or significant melting.

2. The method of claim 1, further including translating the material and the laser beam relative to each other, thereby producing a plurality of material modifications within the material, the material modifications spaced apart so as to separate the material into at least two pieces.

3. The method of claim 1, wherein the laser beam has an average laser pulse energy measured at the material less than about 250 µJ.

4. The method of claim 1, wherein the pulse duration of each pulse of said plurality of pulses is in a range of between greater than about 10 picoseconds and less than about 100 picoseconds.

5. The method of claim 1, wherein the laser beam has a pulse duration less than 10 picoseconds.

6. The method of claim 1, wherein the burst pulse repetition frequency is in a range of between 10 kHz and 1000 kHz.

7. The method of claim 6, wherein the burst pulse repetition frequency is in a range of between 10 kHz and 100 kHz.

8. The method of claim 1, wherein the burst pulse repetition frequency is less than 10 kHz.

9. The method of claim 1, wherein the material is glass.

10. The method of claim 1, wherein the material is sapphire.

11. The method of claim 1, wherein the material is a semiconductor wafer.

12. The method of claim 1, wherein the angle of incidence of the laser beam focal line is less than or equal to about 45 degrees to the surface of the material.

13. The method of claim 1, wherein the angle of incidence of the laser beam focal line is perpendicular to the surface of the material.

14. The method of claim 13, wherein the laser beam focal line is contained entirely within the material, and the laser beam focal line does not extend to either surface of the material.

15. The method of claim 13, wherein the material modification extends within the material to at least one of two opposing surfaces of the material.

16. The method of claim 13, wherein the material modification extends within the material from one of two opposing surfaces of the material to the other one of the two opposing surfaces, over the entire thickness of the material.

17. The method of claim 13, wherein, for each laser pulse, the material modification extends within the material from one of two opposing surfaces of the material to the other one of the two opposing surfaces, over the entire thickness of the material.

18. The method of claim 1, wherein the pulsed laser beam has a wavelength selected such that the material is substantially transparent at this wavelength.

19. The method of claim 1, wherein the wavelength is less than about 1.8 µm.

20. The method of claim 1, wherein the laser beam focal line has an average spot diameter in a range of between 0.5 µm and 5 µm.

21. A system comprising:
    a pulsed laser; and
    an optical assembly positioned in the beam path of the laser, configured to transform the laser beam into an laser beam focal line, viewed along the beam propagation direction, on the beam emergence side of the optical assembly, the laser beam focal line having a length in a range of between 0.1 mm and 100 mm, the optical assembly including a focusing optical element with spherical aberration configured to generate the laser beam focal line, said laser beam focal line adapted to generate an induced absorption within a material, the induced absorption producing a material modification along the laser beam focal line within the material, wherein said laser is a burst pulse laser adapted to produce as the laser beam a burst pulse laser beam, with each burst pulse comprising a plurality of pulses;

the laser beam has an average laser pulse energy measured at the material less than about 400 µJ; and the laser beam is adapted to cause local heating of the material along the focal line and the local heating results in crack formation along the focal line as a result of the thermal stress introduced into the material, without significant ablation or significant melting.

22. The system of claim 17, wherein the laser beam has an average laser pulse energy measured at the material less than about 250 µJ.

23. The system of claim 21, wherein the pulse duration is in a range of between greater than about 10 picoseconds and less than about 100 picoseconds.

24. The system of claim 21, wherein the laser beam has a pulse duration less than 10 picoseconds.

25. The system of claim 21, wherein the pulse repetition frequency is in a range of between 10 kHz and 1000 kHz.

26. The system of claim 25, wherein the pulse repetition frequency is in a range of between 10 kHz and 100 kHz.

27. The system of claim 21, wherein the pulse repetition frequency is less than 10 kHz.

28. The system of claim 21, wherein the optical assembly includes an annular aperture positioned in the beam path of the laser before the focusing optical element, the annular aperture configured to block out one or more rays in the center of the laser beam so that only marginal rays outside the center incide on the focusing optical element, and thereby only a single laser beam focal line, viewed along the beam direction, is produced for each pulse of the pulsed laser beam.

29. The system of claim 21, wherein the focusing optical element is a spherically cut convex lens.

30. The system of claim 29, wherein the focusing optical element is a conical prism having a non-spherical free surface.

31. The system of claim 30, wherein the conical prism is an axicon.

32. The system of claim 21, wherein the optical assembly further includes a second optical element, the two optical elements positioned and aligned such that the laser beam focal line is generated on the beam emergence side of the second optical element at a distance from the second optical element.

33. The system of claim 21, wherein the pulsed laser beam has a wavelength selected such that the material is substantially transparent at this wavelength.

34. The system of claim 33, wherein the wavelength is less than about 1.8 µm.

35. The system of claim 21, wherein the laser beam focal line has an average spot diameter in a range of between 0.5 µm and 5 µm.

36. The system of claim 21, wherein the material is glass.

37. The system of claim 21, wherein the material is sapphire.

38. The system of claim 21, wherein the material is a semiconductor wafer.

39. A system according to claim 21, wherein the laser is a $CO_2$ laser.

* * * * *

UNITED STATES PATENT AND TRADEMARK OFFICE
CERTIFICATE OF CORRECTION

PATENT NO. : 10,421,683 B2
APPLICATION NO. : 14/154525
DATED : September 24, 2019
INVENTOR(S) : Helmut Schillinger et al.

Page 1 of 1

It is certified that error appears in the above-identified patent and that said Letters Patent is hereby corrected as shown below:

On the Title Page

On page 2, Column 2, item (56), U.S. PATENT DOCUMENTS, Line 51, delete "Gamer et al." and insert -- Garner et al. --, therefor.

On page 2, Column 2, item (56), U.S. PATENT DOCUMENTS, Line 64, delete "Gamer et al." and insert -- Garner et al. --, therefor.

On page 3, Column 1, item (56), U.S. PATENT DOCUMENTS, Line 60, delete "Gamer et al." and insert -- Garner et al. --, therefor.

On page 5, Column 2, item (56), other publications, Line 24, delete "551-654;" and insert -- 661-654; --, therefor.

On page 5, Column 2, item (56), other publications, Line 37, delete "Cuffing" and insert -- Cutting --, therefor.

In the Claims

In Column 25, Line 10 (approx.), Claim 22, delete "claim 17," and insert -- claim 21, --, therefor.

Signed and Sealed this
Seventeenth Day of March, 2020

Andrei Iancu
*Director of the United States Patent and Trademark Office*